(12) United States Patent
Tian et al.

(10) Patent No.: US 11,979,884 B2
(45) Date of Patent: May 7, 2024

(54) HARQ TIMING FOR MULTI-PDSCH GRANT

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Zhifei Fan, San Diego, CA (US); Tao Luo, San Diego, CA (US); Wooseok Nam, San Diego, CA (US); Ahmed Abdelaziz Ibrahim Abdelaziz Zewail, San Diego, CA (US); Anantha Krishna Karthik Nagarajan, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 460 days.

(21) Appl. No.: 17/127,870

(22) Filed: Dec. 18, 2020

(65) Prior Publication Data

US 2022/0201660 A1    Jun. 23, 2022

(51) Int. Cl.
*H04L 1/1812* (2023.01)
*H04W 72/21* (2023.01)
*H04W 72/23* (2023.01)

(52) U.S. Cl.
CPC .......... *H04W 72/23* (2023.01); *H04L 1/1812* (2013.01); *H04W 72/21* (2023.01)

(58) Field of Classification Search
CPC ..... H04W 72/23; H04W 72/21; H04W 72/04; H04W 72/042; H04W 72/0446;
(Continued)

(56) References Cited

U.S. PATENT DOCUMENTS 11,349,614 B2 *  5/2022  Karaki ................ H04L 1/0023
11,638,240 B2 *  4/2023  Park .................... H04L 1/1671
                                                          370/336

(Continued)

FOREIGN PATENT DOCUMENTS

WO   2020197195 A1   10/2020
WO   2020212747 A1   10/2020

OTHER PUBLICATIONS

International Search Report and Written Opinion—PCT/US2021/057891—ISA/EPO—dated Feb. 18, 2022.

*Primary Examiner* — Hanh N Nguyen
(74) *Attorney, Agent, or Firm* — Procopio, Cory, Hargreaves & Savitch

(57) ABSTRACT

In an aspect of the disclosure, a method, a computer-readable medium, and an apparatus are provided. The apparatus may be a user equipment (UE). The apparatus may receive, from a base station via a DCI message, an indication of at least one K1 value corresponding to a plurality of physical downlink shared channel (PDSCH) transmissions over a plurality of PDSCH resources. The DCI message may comprise scheduling information for the plurality of PDSCH transmissions. The at least one K1 value may be associated with at least one physical uplink control channel (PUCCH) resource and indicative of a PDSCH-to-hybrid automatic repeat request (HARQ) timing. The apparatus may transmit, to the base station via the at least one PUCCH resource, at least one acknowledgment/negative-acknowledgment (ACK/NACK) indication associated with the at least one K1 value and corresponding to the plurality of PDSCH resources.

36 Claims, 13 Drawing Sheets

(58) Field of Classification Search
CPC .......... H04W 72/0493; H04W 72/0453; H04L 1/1812; H04L 1/1671; H04L 1/1896; H04L 1/1854; H04L 12/28; H04L 1/1861
See application file for complete search history.

(56) References Cited

U.S. PATENT DOCUMENTS

| | | | |
|---|---|---|---|
| 2022/0046610 A1* | 2/2022 | Cheng | H04L 1/1887 |
| 2022/0256543 A1* | 8/2022 | Tian | H04L 1/1819 |
| 2022/0264612 A1* | 8/2022 | Yang | H04L 5/0094 |
| 2022/0322314 A1* | 10/2022 | Rastegardoost | H04L 1/1854 |

* cited by examiner

| | NumOfPDSCHPerK1 | Value of K1s |
|---|---|---|
| Entry 1 | 1 | $K_{1\_0}$ |
| Entry 2 | 1 | $[K_{1\_0}, K_{1\_1}, K_{1\_2}....]$ |
| Entry 3 | 3 | K1 |
| Entry 4 | 16 | K1 |
| ... | | ... |

FIG. 9

HARQ TIMING FOR MULTI-PDSCH GRANT

BACKGROUND

Technical Field

The present disclosure relates generally to communication systems, and more particularly, to hybrid automatic repeat request (HARQ) management in case of a multi-PDSCH grant.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A single downlink control information (DCI) message that schedules multiple physical downlink shared channel (PDSCH) transmissions may help reduce control overhead. To properly handle the timing of the acknowledgment/negative-acknowledgment (ACK/NACK) indications for the multiple PDSCH transmissions scheduled in the same DCI message may be desirable.

In an aspect of the disclosure, a method, a computer-readable medium, and an apparatus are provided. The apparatus may be a user equipment (UE). The apparatus may receive, from a base station via a DCI message, an indication of at least one K1 value corresponding to a plurality of PDSCH transmissions over a plurality of PDSCH resources. The DCI message may comprise scheduling information for the plurality of PDSCH transmissions. The at least one K1 value may be associated with at least one physical uplink control channel (PUCCH) resource and indicative of a PDSCH-to-HARQ timing. The apparatus may transmit, to the base station via the at least one PUCCH resource, at least one ACK/NACK indication associated with the at least one K1 value and corresponding to the plurality of PDSCH transmissions.

In another aspect of the disclosure, a method, a computer-readable medium, and an apparatus are provided. The apparatus may be a base station. The apparatus may transmit, to a UE via a DCI message, an indication of at least one K1 value corresponding to a plurality of PDSCH transmissions over a plurality of PDSCH resources. The DCI message may comprise scheduling information for the plurality of PDSCH transmissions. The at least one K1 value may be associated with at least one PUCCH resource and indicative of a PDSCH-to-HARQ timing. The apparatus may receive, from the UE via the at least one PUCCH resource, at least one ACK/NACK indication associated with the at least one K1 value and corresponding to the plurality of PDSCH transmissions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a diagram of a table including K1-related RRC configuration entries.

DETAILED DESCRIPTION

Figure 1:
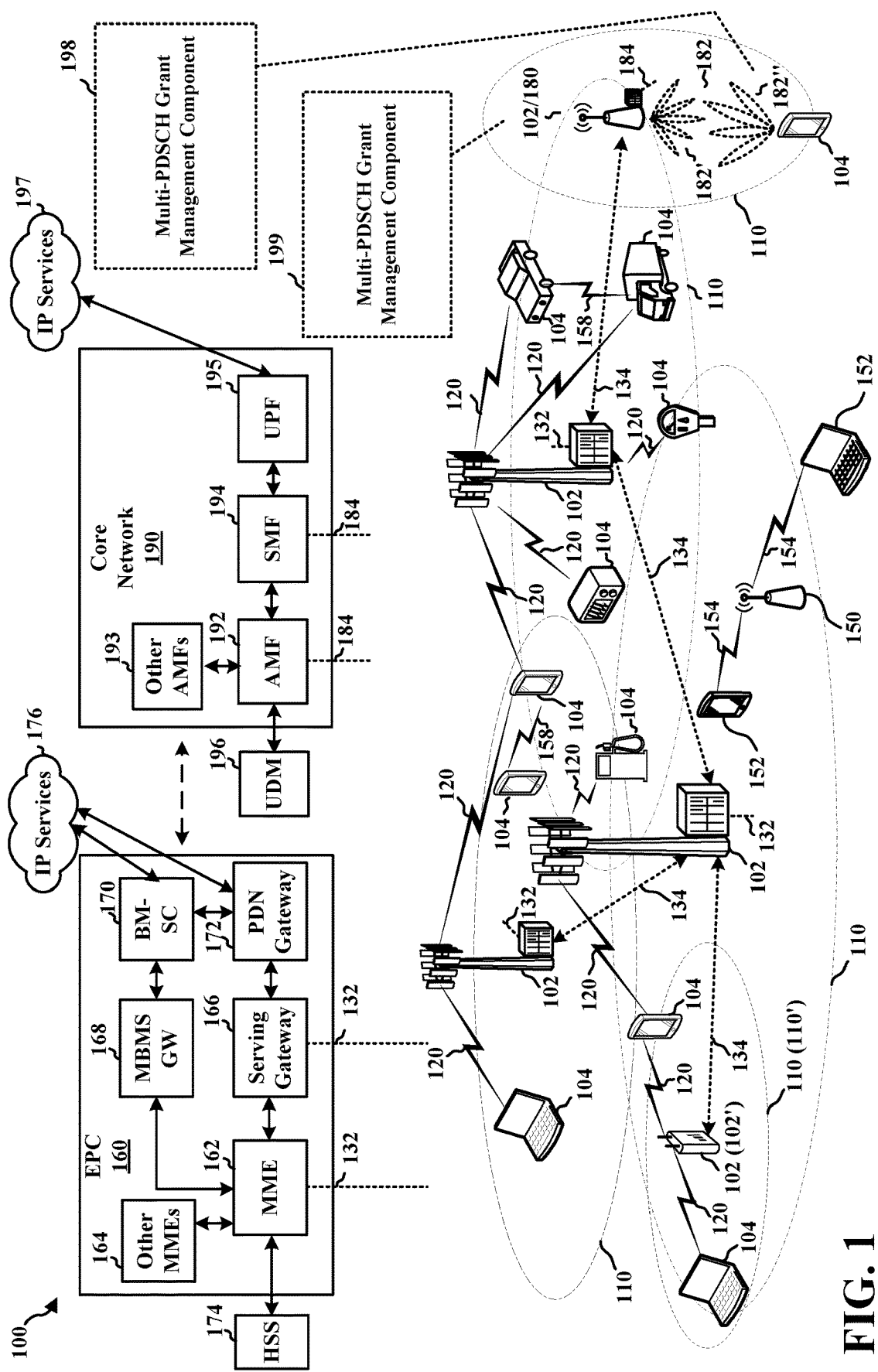
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a multi-PDSCH grant management component 198. The multi-PDSCH grant management component 198 may be configured to receive, from a base station via a DCI message, an indication of at least one K1 value corresponding to a plurality of PDSCH transmissions over a plurality of PDSCH resources. The DCI message may comprise scheduling information for the plurality of PDSCH transmissions. The at least one K1 value may be associated with at least one PUCCH resource and indicative of a PDSCH-to-HARQ timing. The multi-PDSCH grant management component 198 may be further configured to transmit, to the base station via the at least one PUCCH resource, at least one ACK/NACK indication associated with the at least one K1 value and corresponding to the plurality of PDSCH transmissions. In certain aspects, the base station 180 may include a multi-PDSCH grant management component 199. The multi-PDSCH grant management component 199 may be configured to transmit, from a UE via a DCI message, an indication of at least one K1 value corresponding to a plurality of PDSCH transmissions over a plurality of PDSCH resources. The DCI message may comprise scheduling information for the plurality of PDSCH transmissions. The at least one K1 value may be associated with at least one PUCCH resource and indicative of a PDSCH-to-HARQ timing. The multi-PDSCH grant management component 199 may be further configured to receive, from the UE via the at least one PUCCH resource, at least one ACK/NACK indication associated with the at least one K1 value and corresponding to the plurality of PDSCH transmissions. Although the following description may be focused on 5G NR, the concepts described herein may be applicable to other similar areas, such as LTE, LTE-A, CDMA, GSM, and other wireless technologies.

Figure 2:
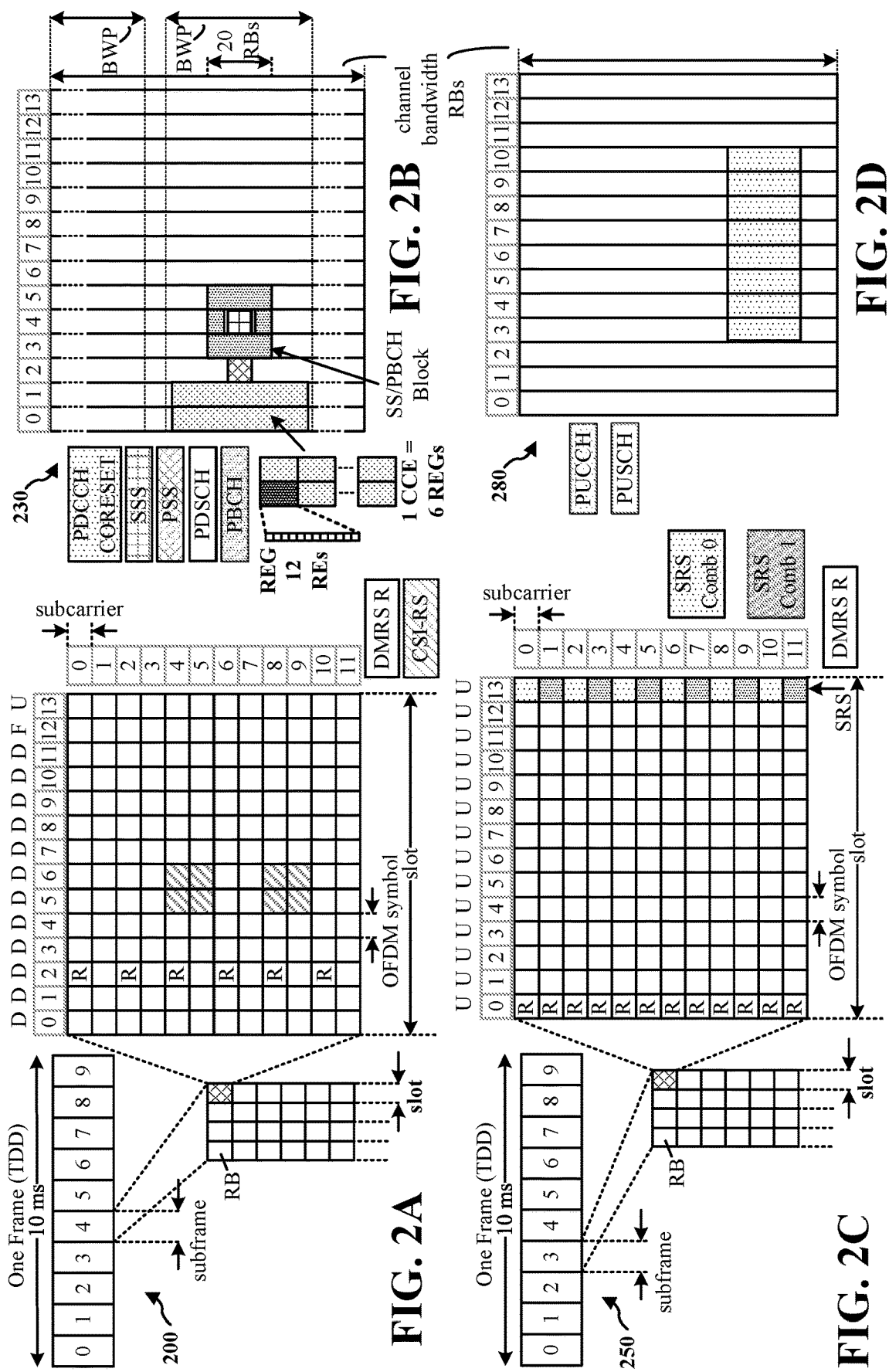
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the PUCCH and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
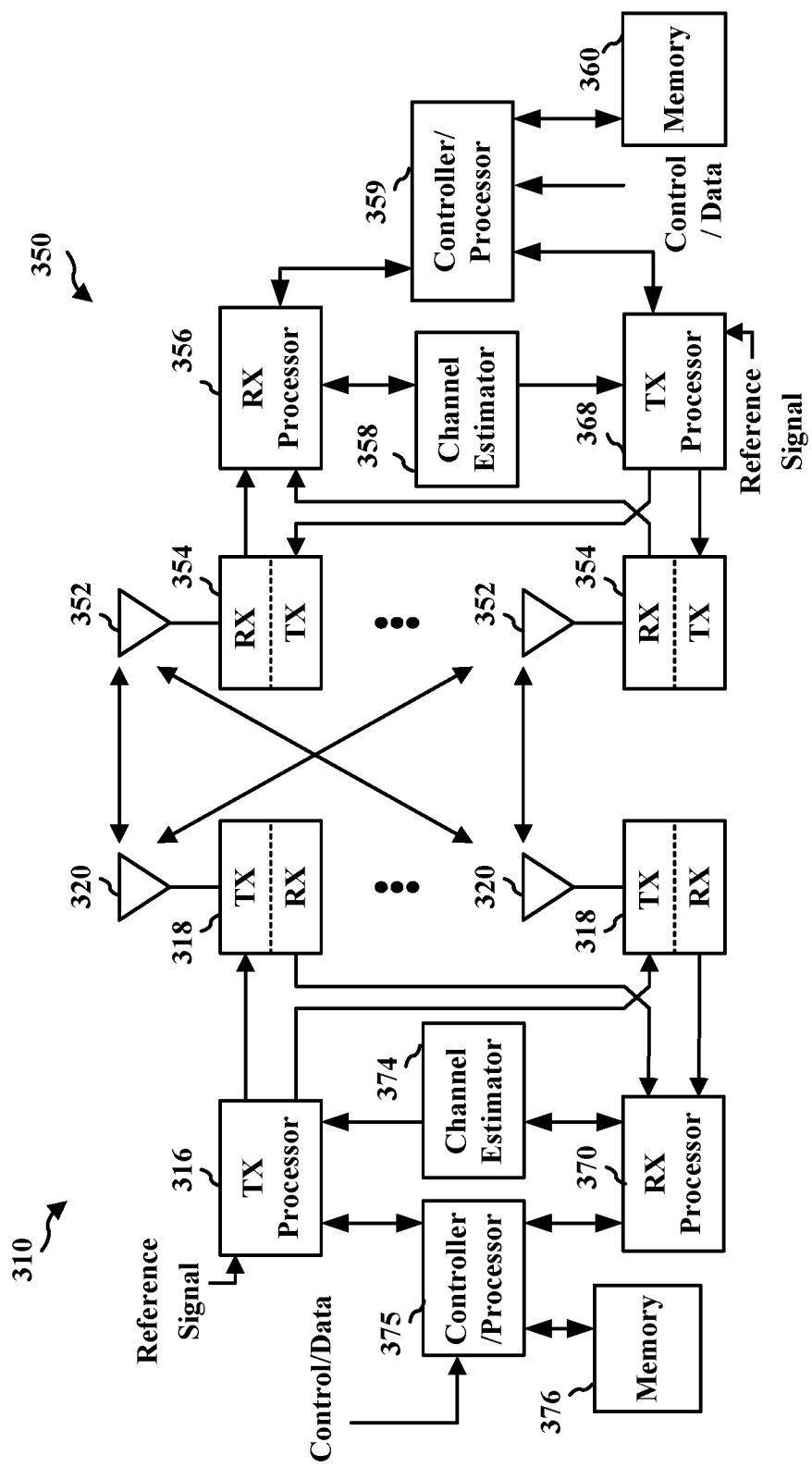
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some aspects of wireless communications, a multiple PUSCH (multi-PUSCH) grant feature may help to reduce control overhead. Multiple continuous PUSCH transmissions may be scheduled within one multi-PUSCH uplink grant. The same frequency domain resource assignment (FDRA), time domain resource assignment (TDRA), modulation and coding scheme (MCS), rank, and some other transmission parameters may be shared for the multiple PUSCH resources scheduled in the multi-PUSCH grant. The starting and ending positions of the transmissions may be provided with the TDRA, where multiple start and length indicator values (SLIVs) are included in a TDRA entry. The multi-PUSCH uplink grant may indicate the first HARQ process identifier (ID), and later transmissions may use incremental HARQ process IDs. A separate new data indicator (NDI) and a separate redundancy version identifier (RVID) (which may be compressed) may be associated with each of the multiple scheduled PUSCH resources. These features help strike a balance between scheduling flexibility and a length of a DCI message.

In some aspects, a multiple PDSCH (multi-PDSCH) grant feature may help to reduce control overhead. It should be appreciated that the slots may be shorter for the mmW channel, especially when a higher subcarrier spacing (SCS) parameter is used.

In one aspect, common MCS, rank, precoding matrix, FDRA, and TDRA may be used for the multiple PDSCH transmissions scheduled in the multi-PDSCH grant. The multi-PDSCH grant may help schedule a longer downlink burst. Many design goals may be the same between a multi-PDSCH grant and a multi-PUSCH grant. Thus, many design flavors may directly be leveraged. However, there may also be some downlink grant specific issues that may need to be separately considered. The multi-PDSCH downlink grant may indicate the first HARQ process ID, and the later transmissions may use incremental HARQ process IDs. A separate NDI and a separate RVID (which may be compressed) may be associated with each of the multiple scheduled PDSCH transmissions.

In one aspect, SLIVs may be chosen so that sufficiently long gaps may be provided between consecutive PDSCH transmissions scheduled with a multi-PDSCH grant. The gaps may have several functions. For example, the gaps may allow uplink feedback in the middle of the multiple PDSCH transmissions for the served UE and for other UEs. For another example, the gaps may allow downlink monitoring of the served UE and downlink control transmission to the served UE as well as other UEs.

It may be desirable to properly handle the timing of the ACK/NACK indications for the transmissions of the multiple PDSCH transmissions scheduled with the multi-PDSCH grant. It may also be desirable to properly handle the PUCCH resource indicator (PRI) and the downlink assignment index (DAI) with respect to the multi-PDSCH grant.

Figure 4:
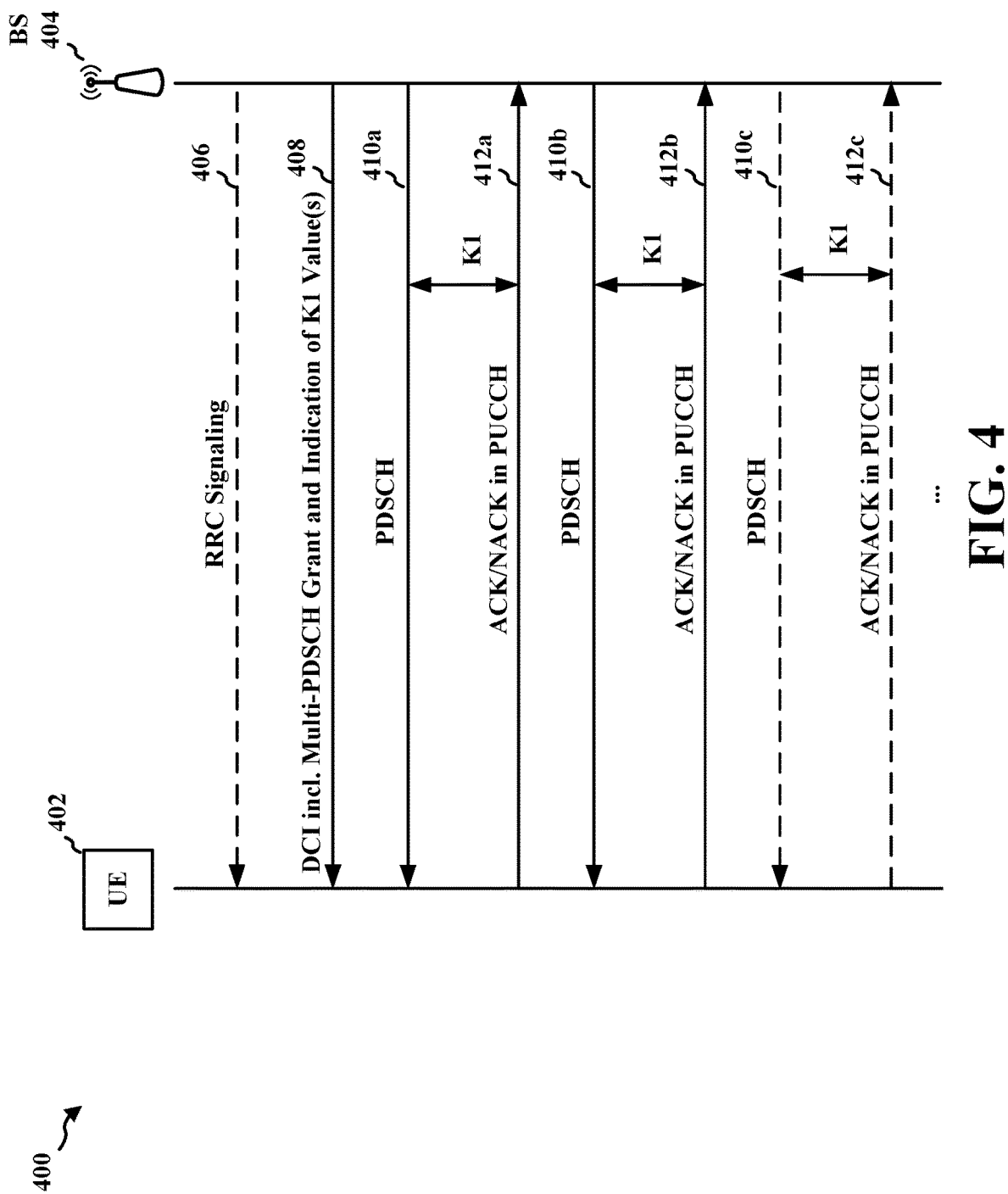
FIG. 4 is a communication flow of an example method of wireless communication.

FIG. 4 is a communication flow 400 of an example method of wireless communication. At 406, the UE 402 may receive from the base station (BS) 404, and the BS 404 may transmit to the UE 402, RRC signaling. At 408, the UE 402 may receive from the BS 404, and the BS 404 may transmit to the UE 402, a DCI message (e.g., a multi-PDSCH grant) scheduling multiple PDSCH transmissions over multiple PDSCH resources for downlink transmission and including at least one K1 value associated with the plurality of PDSCH transmissions. A K1 value may be a PDSCH-to-HARQ timing indicator and may indicate a timing delay, expressed in a number of slots, between a PDSCH resource or a last PDSCH resource of a group of PDSCH resources and an associated PUCCH resource carrying the ACK/NACK indicator for the PDSCH resource or the group of PDSCH resources. At 410a, the BS 404 may transmit to the UE 402, and the UE 402 may receive from the BS 404, a PDSCH transmission, which may be one of the multiple scheduled PDSCH transmissions. At 412a, the UE 402 may transmit to the BS 404, and the BS 404 may receive from the UE 402, an ACK/NACK indication corresponding to the PDSCH transmission at 410a in a PUCCH resource. The timing delay between the PDSCH transmission at 410a and the transmission of the PUCCH resource carrying the corresponding ACK/NACK indication at 412a may be indicated by the associated K1 value.

Similarly, at 410b, the BS 404 may transmit to the UE 402, and the UE 402 may receive from the BS 404, another PDSCH transmission, which may be one of the multiple scheduled PDSCH transmissions. At 412b, the UE 402 may transmit to the BS 404, and the BS 404 may receive from the UE 402, an ACK/NACK indication corresponding to the PDSCH transmission at 410b in a PUCCH resource. The timing delay between the PDSCH transmission at 410b and the transmission of the PUCCH resource carrying the corresponding ACK/NACK indication at 412b may be indicated by the associated K1 value. In different aspects, the K1 values may be the same, or may be different, as will be apparent from the description below. It should be appreciated that the exact locations of the PUCCHs carrying the ACK/NACK indications (e.g., 412a, 412b, . . . , etc.) in FIG. 4 are illustrative, and do not limit the disclosure. For example, in aspects not illustrated here, 412a may take place after 410b, and 412b may take place before 410b, etc. Optionally, additional PDSCH transmission/reception and transmission/reception of ACK/NACK indicators over the PUCCH (e.g., 410c, 412c, etc.) may take place according to the multi-PDSCH grant.

Figure 5:
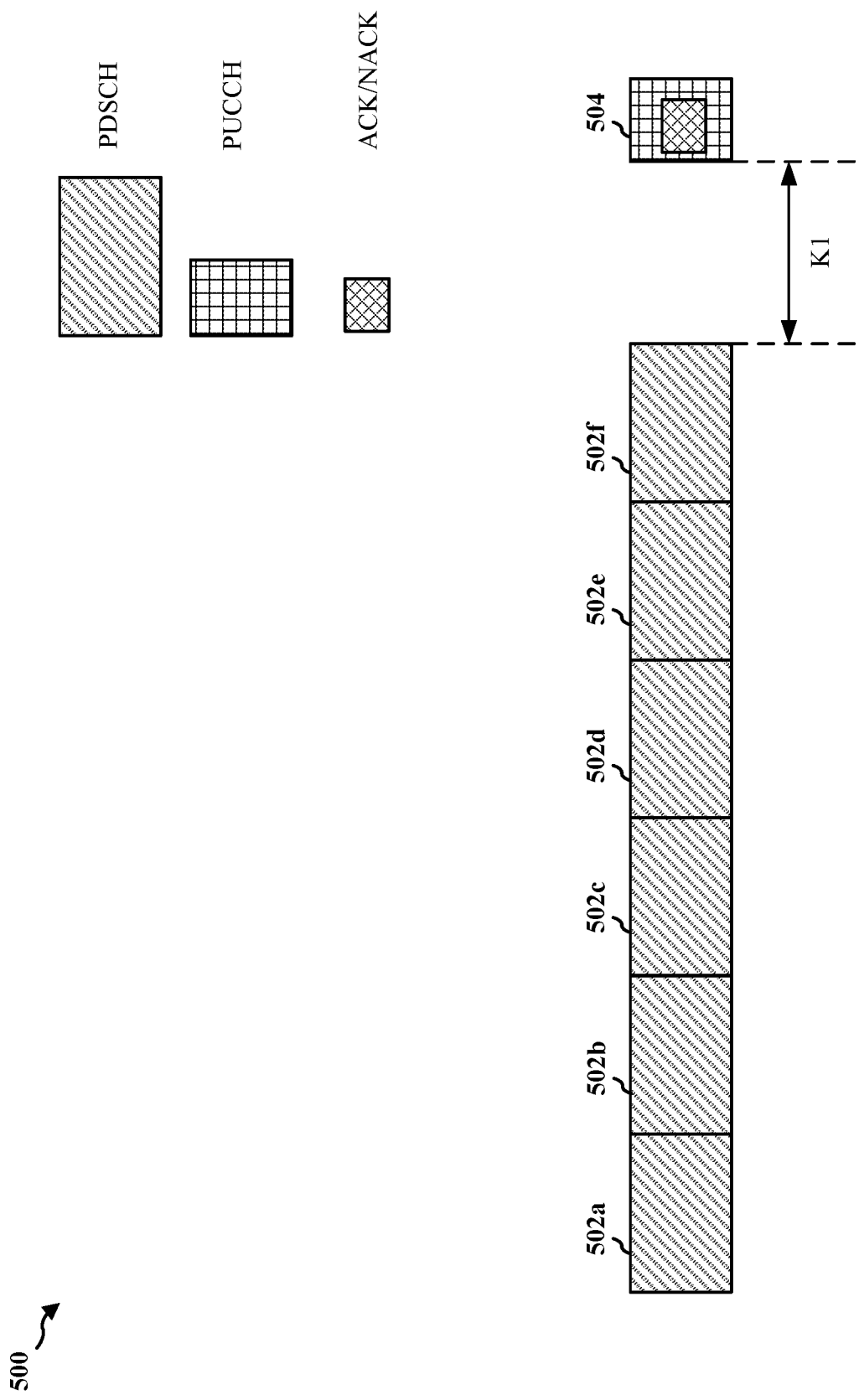
FIG. 5 is a block diagram illustrating PDSCH-to-HARQ timing delay according to some aspects.

FIG. 5 is a block diagram 500 illustrating PDSCH-to-HARQ timing delay according to some aspects. As shown in FIG. 5, a DCI message, e.g., the DCI message transmitted at 408 in FIG. 4, may schedule a number of PDSCH transmissions, e.g., six (6) PDSCH transmissions over 6 PDSCH resources (502a-f), for downlink transmission. The DCI message may further include an indication of a single K1 value for all the scheduled PDSCH resources. Accordingly, one or more ACK/NACK indications may be transmitted from a UE to a BS, e.g., the UE 402 to the BS 404 in FIG. 4, for all the PDSCH transmissions (e.g., the PDSCH transmissions over the PDSCH resources 502a-f) in a single PUCCH resource 504. In one aspect, one ACK/NACK indication may be transmitted for each PDSCH transmission. In another aspect, a single group ACK/NACK indication may be transmitted for all the associated PDSCH transmissions. The K1 value may indicate a timing delay, in the number of slots, between the last PDSCH resource of all the scheduled PDSCH resources (i.e., the PDSCH resource 502̲0 and the PUCCH resource 504. Using a single K1 value and a single PUCCH resource to carry the ACK/NACK indications for all the PDSCH resources scheduled in the multi-PDSCH grant may represent a simple solution with a small control overhead. It is similar to the solution used with the multi-PUSCH grant where a single K2 value is provided to indicate the timing offset from the multi-PUSCH grant to the first PUSCH transmission. However, using a single K1 value and a single PUCCH resource may be associated with a long feedback delay, especially for earlier PDSCH transmissions scheduled in the multi-PDSCH grant.

Figure 6:
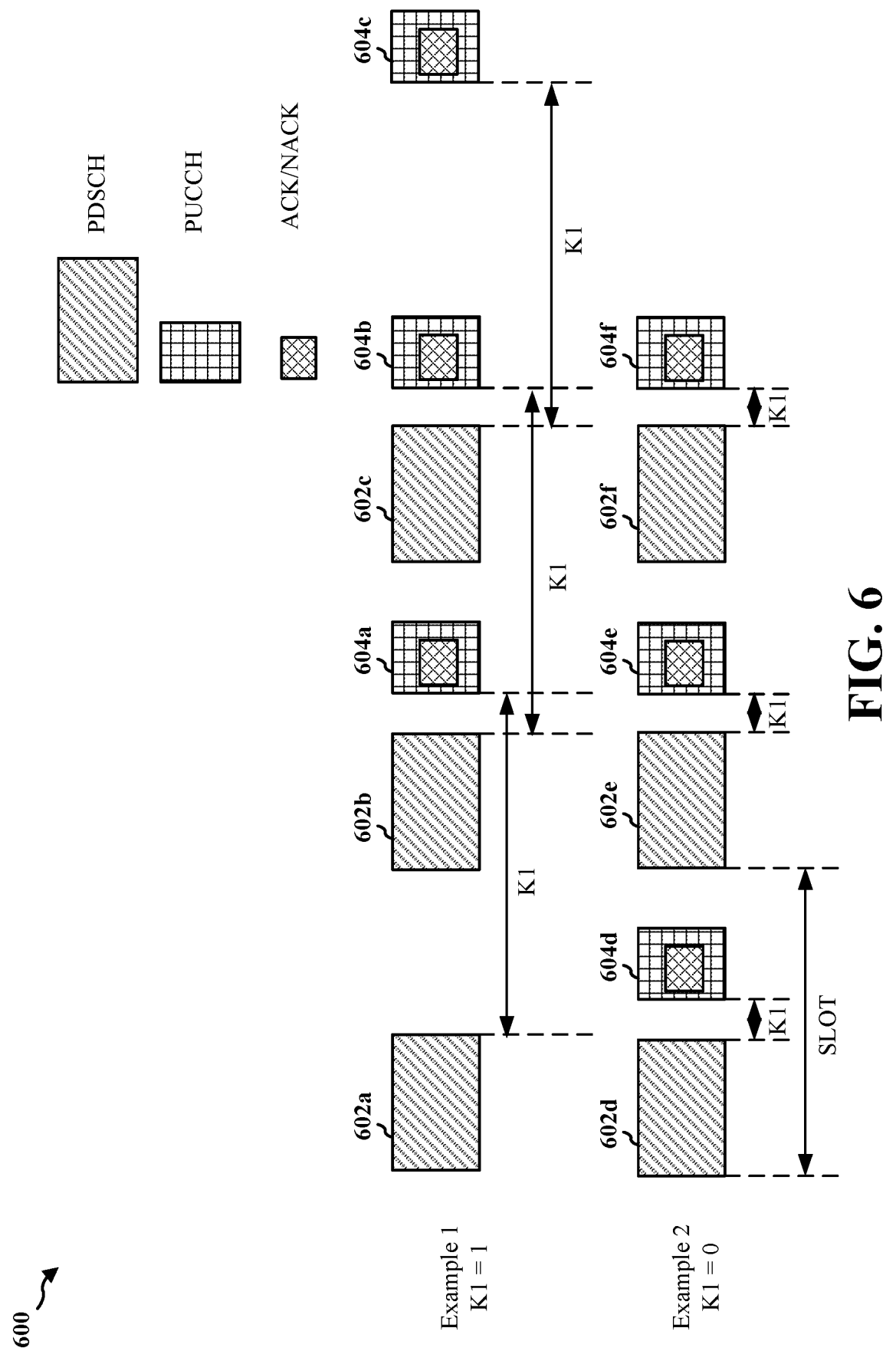
FIG. 6 is a block diagram illustrating PDSCH-to-HARQ timing delay according to some aspects.

FIG. 6 is a block diagram 600 illustrating PDSCH-to-HARQ timing delay according to some aspects. As shown in each of the examples in FIG. 6, a DCI message (e.g., a multi-PDSCH grant), e.g., the DCI message transmitted at 408 in FIG. 4, may schedule a number of PDSCH transmissions, e.g., three (3) PDSCH transmissions over 3 PDSCH resources (602a-c, 602d-f, respectively). The DCI message may further include an indication of a single K1 value that may be applicable for each of the multiple scheduled PDSCH transmissions, individually. Accordingly, one PUCCH resource is provided to carry the corresponding ACK/NACK indication for each of the multiple PDSCH transmissions. For example, the PUCCH resource 604a is provided for the PDSCH transmission over the PDSCH resource 602a, the PUCCH resource 604b is provided for the PDSCH transmission over the PDSCH resource 602b, the PUCCHs resources 604c-f are provided for the PDSCH transmissions over the PDSCH resources 602c-f, respectively, and so on. The single K1 value may indicate a timing delay, in the number of slots, between each of the scheduled PDSCH resources and the PUCCH resource corresponding to the PDSCH resource (e.g., between the PDSCH resource 602a and the PUCCH resource 604a). In one illustrated example, the single K1 value may indicate a timing delay of one (1) slot. Accordingly, the transmission and reception of a PUCCH resource may take place 1 slot after the corresponding PDSCH resource. For example, the PUCCH resource 604a may lag behind the PDSCH resource 602a by 1 slot. In the other illustrated example, the single K1 value may indicate a timing delay of 0 slot, which may indicate that the PUCCH resource may be within the same slot as the corresponding PDSCH resource. For example, the PUCCH resource 604d and the corresponding PDSCH resource 602d may be within the same slot. A BS, e.g., the BS 404 in FIG. 4, may provide suitable gaps between consecutive PDSCH transmissions scheduled in the multi-PDSCH grant to allow a UE, e.g., the UE 402 in FIG. 4, to transmit the ACK/NACK indications.

Figure 7:
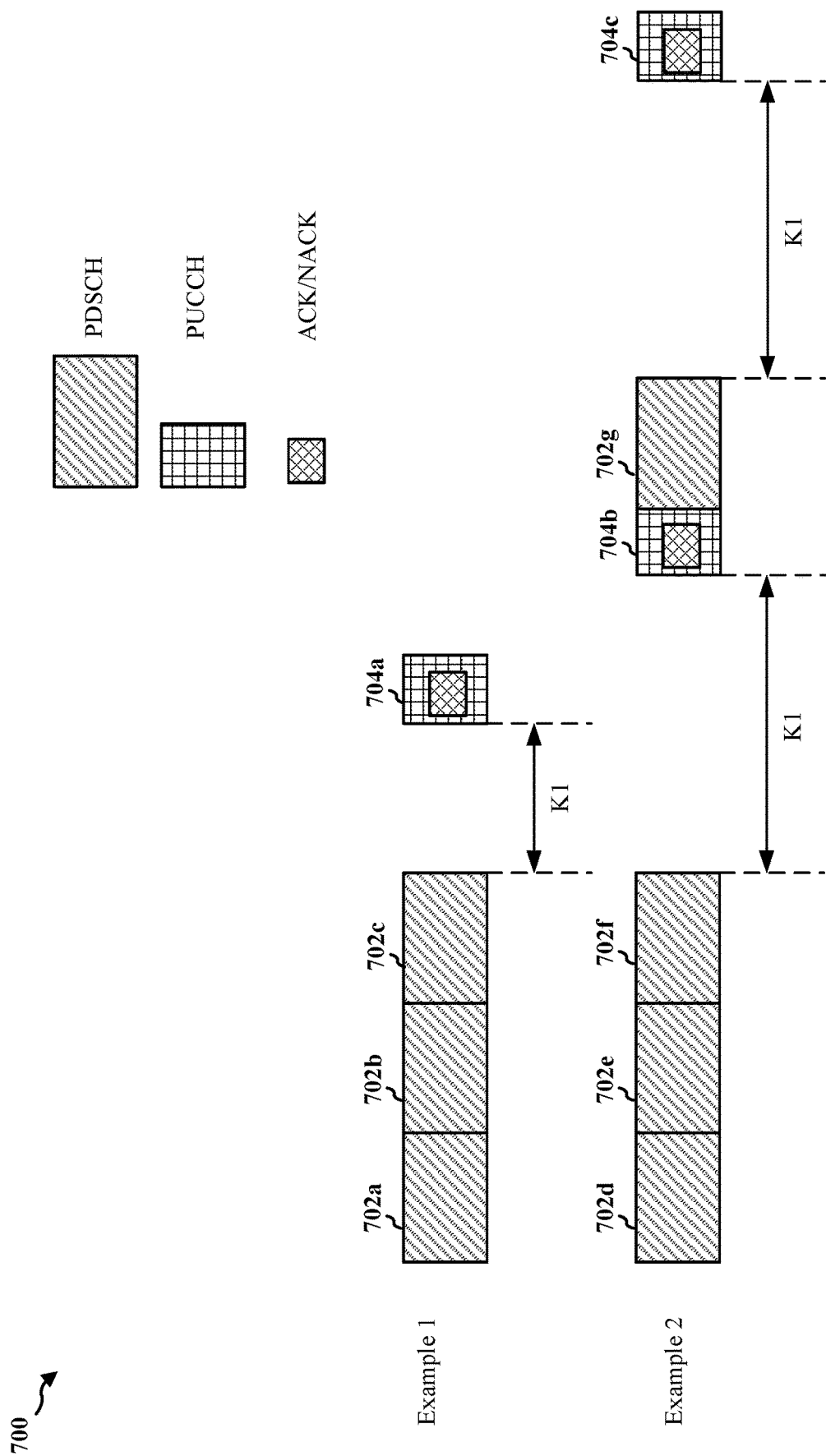
FIG. 7 is a block diagram illustrating PDSCH-to-HARQ timing delay according to some aspects.

FIG. 7 is a block diagram 700 illustrating PDSCH-to-HARQ timing delay according to some aspects. As shown in FIG. 7, a DCI message (e.g., a multi-PDSCH grant), e.g., the DCI message transmitted at 408, may schedule, in the two illustrated examples, three (3) PDSCH transmissions and four (4) PDSCH transmissions over 3 PDSCH resources (702a-c) and 4 PDSCH resources (702d-g), respectively. The multiple scheduled PDSCH transmissions may be organized into one or more groups based on a PDSCH transmission group size parameter (e.g., "NumOfPdschPerK1") that may specify a number of consecutive PDSCH transmissions per group. In both illustrated examples, the "NumOfPdschPerK1" parameter may specify that each PDSCH transmission group comprise three (3) consecutive PDSCH transmissions. Accordingly, in one example, PDSCH transmissions over the PDSCH resources 702a-c may form one group. In the other example, PDSCH transmissions over the PDSCH resources 702d-f may form one group, and the PDSCH transmission over the PDSCH resource 702g may form a separate group. It should be appreciated that in some scenarios one of the PDSCH groups (e.g., the last PDSCH group) may contain fewer than the per group number of PDSCH transmissions specified by the "NumOfPdschPerK1" parameter because the total number of PDSCH transmissions scheduled in the multi-PDSCH grant may not be divisible by the per group number of PDSCH transmissions as specified by the "NumOfPdschPerK1" parameter. The DCI message may further include an indication of one or more K1 values. Each PDSCH group may be associated with a K1 value. For example, the PDSCH group comprising PDSCH transmissions over the PDSCH resources 702d-f may be associated with a K1 value, the PDSCH group comprising the PDSCH transmission over the PDSCH resource 702g may be associated with a K1 value, and so on. A K1 value may indicate a timing delay, in the number of slots, between the last PDSCH resource of the associated group of PDSCH resources and the PUCCH resource corresponding to the group of PDSCH resources (e.g., between the PDSCH resource 702c and the PUCCH resource 704a, between the PDSCH resource 702f and the PUCCH resource 704b, between the PDSCH resource 702g and the PUCCH resource 704c, and so on). Accordingly, there may be one or more PUCCH resources to carry the ACK/NACK indications. In one aspect, a same K1 value may be provided in the DCI message and utilized for each of the PDSCH groups. In another aspect, different K1 values (which may form a vector of K1 values) may be provided and utilized for different PDSCH groups, e.g., each PDSCH group of the multiple PDSCH groups may use a single K1 value of multiple K1 values. It should be appreciated that when the total number of PDSCH transmissions scheduled in the multi-PDSCH grant is smaller than the per group number of PDSCH transmissions specified by the parameter, all the PDSCH transmissions may be collected in a same group, and one or more ACK/NACK indications may be transmitted and received in one PUCCH resource for all the PDSCH transmissions. Example 1 of FIG. 7 illustrates this scenario, which is similar to the scenario illustrated in FIG. 5. In one aspect, one ACK/NACK indication may be transmitted for each PDSCH transmission. In another aspect, a single group ACK/NACK indication may be transmitted for all the associated PDSCH transmissions.

Figure 8:
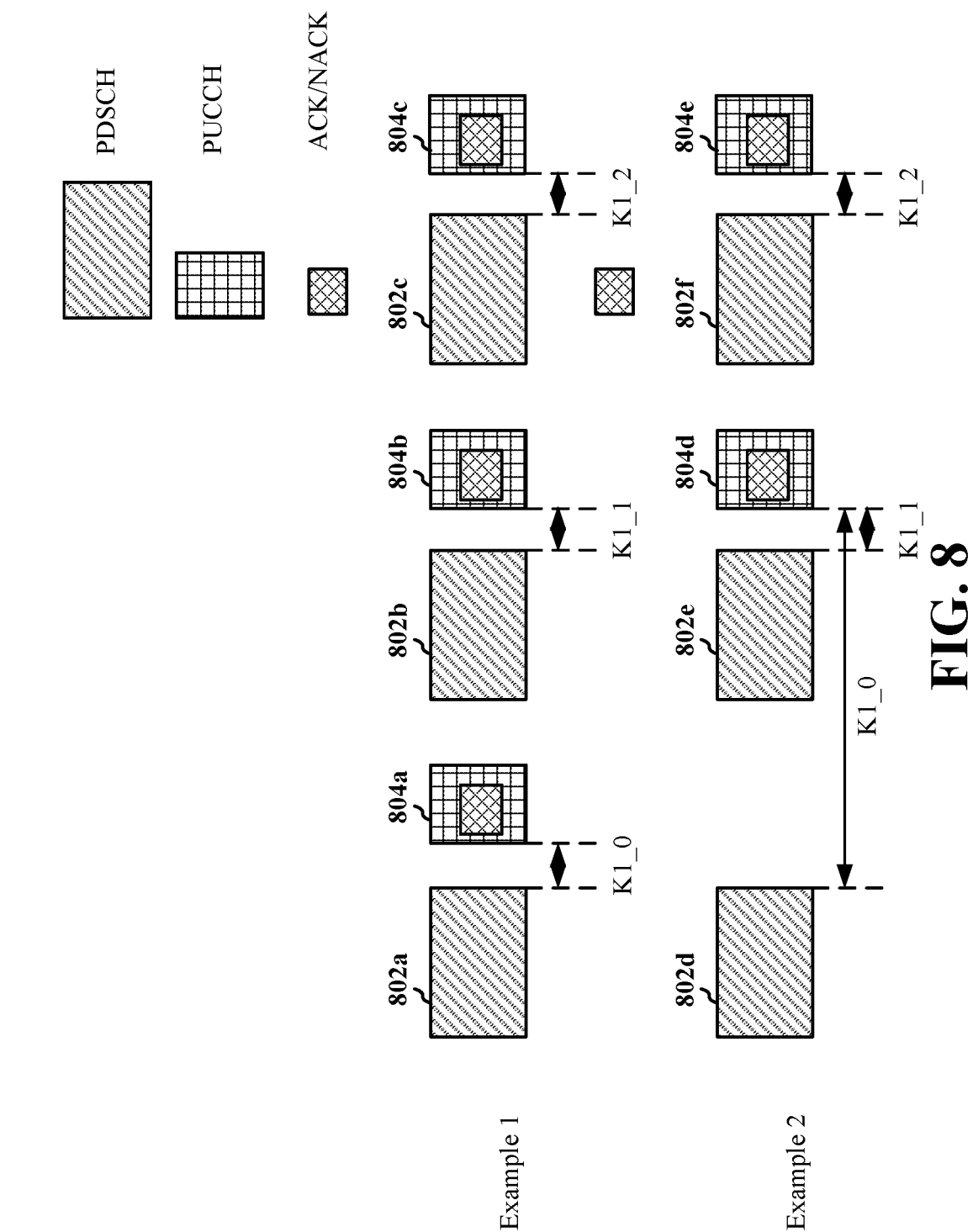
FIG. 8 is a block diagram illustrating PDSCH-to-HARQ timing delay according to some aspects.

FIG. 8 is a block diagram 800 illustrating PDSCH-to-HARQ timing delay according to some aspects. As shown in FIG. 8, a DCI message (e.g., a multi-PDSCH grant), e.g., the DCI message transmitted at 408 in FIG. 4, may schedule, as shown in each of the two illustrated examples, three (3) PDSCH transmissions over 3 PDSCH resources (802a-c, 802d-f, respectively). The DCI message may further include an indication of multiple K1 values. Each PDSCH transmission may be associated with one respective K1 value. For example, in Example 1 illustrated in FIG. 8, each of the PDSCH transmissions over the PDSCH resources 802a-c is associated with one of the K1 values K1_0, K1_1, and K1_2, respectively. A K1 value may indicate a timing delay, in the number of slots, between a PDSCH resource and the PUCCH resource corresponding to the PDSCH resource (e.g., between PDSCH resources 802a-c and the PUCCH resources 804a-c, respectively, between the PDSCH resource 802d and the PUCCH resource 804d, between the PDSCH resource 802e and the PUCCH resource 804d, between the PDSCH resource 802f and the PUCCH resource 804e, and so on). Accordingly, one or more PUCCH resources may be provided to carry the ACK/NACK indications. In one aspect, a vector of K1 values comprising the multiple K1 values for the multiple PDSCH transmissions may be preconfigured with RRC signaling, e.g., the RRC signaling 406 in FIG. 4, as an RRC configuration entry (e.g., a "multi-pdsch-DataToUL-ACK" entry). A DCI message, e.g., the DCI message transmitted at 408 in FIG. 4, may include a K1 value index that points to the preconfigured RRC configuration entry. This approach may be associated with flexibility and a good tradeoff between overhead and delay. In another aspect, the vector of K1 values comprising the multiple K1 values may be explicitly indicated within the DCI message, e.g., the DCI message transmitted at 408 in FIG. 4. In this aspect, the DCI message may include multiple K1 value fields to accommodate the multiple K1 values, e.g., one K1 value for each PDSCH. However, this approach may cause the DCI message to have a variable length. A BS, e.g., the BS 404 in FIG. 4, may provide suitable gaps between consecutive PDSCH transmissions scheduled in the multi-PDSCH grant to allow a UE, e.g., the UE 402 in FIG. 4, to transmit the ACK/NACK indications. It should be appreciated that aspects illustrated in FIG. 8 may be considered a special case of some of the aspects illustrated in FIG. 7, where the per group number of PDSCH transmissions is specified as a certain number, e.g., one (1).

In one aspect, a BS, e.g., the BS 404 in FIG. 4, may specify a maximum allowed number of PUCCH resources (e.g., "MaxNumofPucch") for ACK/NACK indications for multiple PDSCH transmissions scheduled in a multi-PDSCH grant. The maximum allowed number of feedback PUCCH resources may be indicated through RRC signaling, e.g., RRC signaling 406. In one aspect, a BS, e.g., the BS 404 in FIG. 4, may determine a total number of PDSCH transmissions scheduled in a multi-PDSCH grant based on the maximum allowed number of PUCCH resources. In other words, the DCI for a multi-PDSCH grant can be adjusted based on the maximum allowed number of PUCCH resources. Accordingly, in one aspect, a UE, e.g., the UE 402, may, upon receiving and/or decoding a DCI message, e.g., the DCI message at 408, including a multi-PDSCH grant, determine a number of PDSCH groups (i.e., the number of corresponding PUCCH resources) (e.g., "NumofPucchgroup") for the PDSCH transmissions scheduled in the multi-PDSCH grant. In one aspect, if a single K1 value is indicated in the DCI message, then the UE, e.g., UE 402, may determine NumofPucchgroup to be either MaxNumofPucch or the number of the PDSCH transmissions scheduled in the multi-PDSCH grant, whichever is smaller. In one aspect, the BS, e.g., BS 404, may include in the DCI message, e.g., the DCI message transmitted at 408, a dynamically specified number of PDSCH groups (e.g., "NumofPucchgroup"), which may be less than or equal to the maximum allowed number of PUCCH resources (e.g., "MaxNumofPucch"), and the UE, e.g., UE 402, may use the dynamically specified number of PDSCH groups when organizing the PDSCH transmissions into groups.

It should be appreciated that with the exception of the last PUCCH resource, the number of PDSCH transmissions to which each PUCCH resource corresponds (i.e., the PDSCH group size) may be calculated as floor (the number of the PDSCH transmissions scheduled in the multi-PDSCH grant/ NumofPucchgroup) (where floor (x) is the floor function that gives as output the greatest integer less than or equal to x), and the number of PDSCH transmissions to which the last PUCCH resource corresponds may be calculated as (the number of the PDSCH transmissions scheduled in the multi-PDSCH grant)−(NumofPucchgroup−1)*floor (the number of the PDSCH transmissions scheduled in the multi-PDSCH grant/NumofPucchgroup). In one aspect, the DCI message may further include an indication of multiple K1 values. Each PDSCH transmission may be associated with one respective K1 value. In other words, the length of the vector of K1 values may be equal to the number of the PDSCH transmissions scheduled in the multi-PDSCH grant. A K1 value may indicate a timing delay, in the number of slots, between the associated PDSCH resource and the corresponding PUCCH resource. The BS, e.g., BS 404, may ensure that the implied number of PUCCH resources as indicated in the DCI message, e.g., DCI message transmitted at 408, does not exceed the maximum allowed number of PUCCH resources.

FIG. 9 is a diagram 900 of a table including K1-related RRC configuration entries. The table illustrated in FIG. 9 may comprise the "multi-pdsch-DataToUL-ACK" entries described in relation to FIG. 8 above, and may be preconfigured with the RRC signaling at 406. Each entry comprises a PDSCH group size (e.g., "NumOfPdschPerK1") and one or more K1 values (more than one K1 values within an entry may form a vector of K1 values). Therefore, the DCI message, e.g., DCI message transmitted at 408, may include a K1 value index that points to one of the preconfigured RRC configuration entries. If an entry contains a vector of K1 values comprising multiple K1 values, each K1 value in the vector may correspond to one group of PDSCH transmissions (it should be appreciated that the group size may be 1 in some aspects). The last PDSCH transmission in a PDSCH transmission group may be used as the reference for counting the PDSCH-to-HARQ timing delay.

The PDSCH group size (e.g., the "NumOfPdschPerK1" parameter) may be specified in different ways according to different aspects. In one aspect, a DCI message, e.g., the DCI message transmitted at 408 in FIG. 4, may include a PDSCH group size index that points to one of the at least one preconfigured RRC configuration entry (e.g., the "multi-pdsch-DataToUL-ACK" entry described above), according to which a PDSCH group size may be obtained. In another aspect, the PDSCH group size may be explicitly indicated within the DCI message, e.g., the DCI message transmitted at 408 in FIG. 4. In yet another aspect, the PDSCH group size may be preconfigured through RRC signaling, e.g., the RRC signaling 406.

In one aspect, all PUCCH resources may be associated with a same PRI. This may have the benefit of lower overhead, but flexibility may be restricted. In another aspect, a separate PRI may be associated with each PUCCH resource. In one aspect, the PRIs may be included in the DCI message. However, this may be associated with a large overhead. In another aspect, a table comprising vectors of PRIs each of which includes multiple PRIs may be preconfigured, and an index may be included in the DCI message that points to one entry of the preconfigured table.

Figure 10:
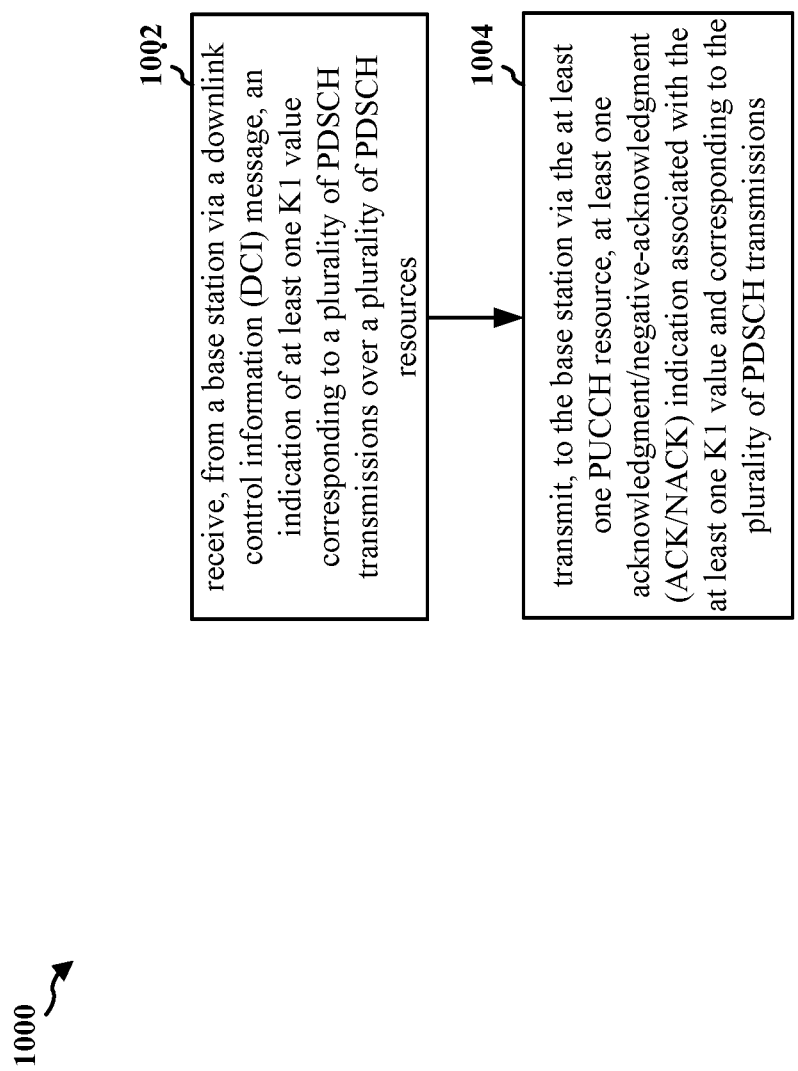
FIG. 10 is a flowchart of a method of wireless communication.

FIG. 10 is a flowchart 1000 of a method of wireless communication. The method may be performed by a UE (e.g., the UE 104; the UE 402; the apparatus 1202). At 1002, the UE may receive, from a base station via a DCI message, an indication of at least one K1 value corresponding to a plurality of PDSCH transmissions over a plurality of PDSCH resources. The DCI message may comprise scheduling information for the plurality of PDSCH transmissions. The at least one K1 value may be associated with at least one PUCCH resource and indicative of a PDSCH-to-HARQ timing. For example, 1002 may be performed by the downlink control component 1240 in FIG. 12 via the reception component 1230 via the transmission component 1234.

At 1004, the UE may transmit, to the base station via the at least one PUCCH resource, at least one ACK/NACK indication associated with the at least one K1 value and corresponding to the plurality of PDSCH transmissions. For example, 1004 may be performed by acknowledgment component 1242 in FIG. 12.

In one aspect, the at least one K1 value may indicate a timing delay, in slots, between a corresponding PDSCH resource or a last PDSCH resource of a corresponding group of PDSCH resources and an associated one of the at least one PUCCH resource.

In one aspect, referring back to FIG. 6, the at least one K1 value may comprise a single K1 value applicable to each of the plurality PDSCH transmissions. The at least one PUCCH resource may comprise a plurality of PUCCH resources. Each of the plurality of PDSCH transmissions may correspond to one of the plurality of PUCCH resources. The at least one ACK/NACK indication may comprise a plurality of ACK/NACK indications. The UE may further transmit, to the base station via the plurality of PUCCH resources, the plurality of ACK/NACK indications. Each of the plurality of PDSCH transmissions may be associated with one of the plurality of ACK/NACK indications. Each of the plurality of PUCCH resources may carry one of the plurality of ACK/NACK indications.

In one aspect, referring back to FIG. 7, the plurality of PDSCH transmissions may be organized into at least one group of PDSCH transmissions. The at least one K1 value may comprise a single K1 value applicable to each of the at least one group of PDSCH transmissions. Each group of the at least one group of PDSCH transmissions may be associated via the single K1 value with one of the at least one PUCCH resource and one or more of the at least one ACK/NACK indication carried in the one associated PUCCH resource. In one aspect, each of the at least one group of PDSCH transmissions or all except one of the at least one group of PDSCH transmissions may comprise an equal quantity of consecutive PDSCH transmissions.

In one aspect, the plurality of PDSCH transmissions may be organized into a plurality of groups of PDSCH transmissions. The at least one K1 value may comprise a plurality of K1 values. Each of the plurality of K1 values may be applicable to a respective one of the plurality of groups of PDSCH transmissions. Each group of the plurality of groups of PDSCH transmissions may be associated via the respective K1 value with one of the at least one PUCCH resource. The at least one ACK/NACK indication may comprise a plurality of ACK/NACK indications. The UE may further transmit, to the base station via the at least one PUCCH resource, the plurality of ACK/NACK indications. Each group of the plurality of groups of PDSCH transmissions may be associated with one or more of the plurality of ACK/NACK indications. In one aspect, each of the plurality of groups of PDSCH transmissions or all except one of the plurality of groups of PDSCH transmissions may comprise an equal quantity of consecutive PDSCH transmissions.

In one aspect, the UE may further receive, from the base station via RRC signaling, a first limit on a quantity of the at least one PUCCH resource (e.g., the "MaxNumofPucch" limit described above). The UE may organize the plurality of PDSCH transmissions into the plurality of groups of PDSCH transmissions based on the first limit. A group quantity of the plurality of groups of PDSCH transmissions may be less than or equal to the first limit.

In one aspect, the UE may further receive, from the base station in the DCI message, a second limit on a quantity of the at least one PUCCH resource (e.g., the "NumPucchgroup" parameter described above). The second limit may be less than or equal to the first limit. The UE may organize the plurality of PDSCH transmissions into the plurality of groups of PDSCH transmissions based on the second limit. The group quantity of the plurality of groups of PDSCH transmissions may be less than or equal to the second limit.

In one aspect, referring back to FIG. 8, the at least one K1 value may comprise a plurality of K1 values. Each of the plurality of K1 values may be applicable to a respective one of the plurality PDSCH transmissions. Each of the plurality of PDSCH transmissions may be associated via the respective K1 value with one of the at least one PUCCH resource. The at least one ACK/NACK indication may comprise a plurality of ACK/NACK indications. The UE may further transmit, to the base station via the at least one PUCCH resource, the plurality of ACK/NACK indications. Each of the plurality of PDSCH transmissions may be associated with one of the plurality of ACK/NACK indications.

In one aspect, the indication of the at least one K1 value received via the DCI message may be associated with RRC signaling entry comprising the plurality of K1 values. In one aspect, the indication of the at least one K1 value received via the DCI message may comprise, in the DCI message, the plurality of K1 values.

In one aspect, the plurality of PDSCH transmissions may be organized into at least one group of PDSCH transmissions, each group of the at least one group of PDSCH transmissions may be associated with one of the at least one K1 value. Each group of the at least one group of PDSCH transmissions may correspond via the associated one K1 value to one of the at least one PUCCH resource and one or more of the at least one ACK/NACK indication. The indication of the at least one K1 value received via the DCI message may be associated with a first table received via RRC signaling (e.g., the table illustrated in FIG. 9). The first table may comprise at least one entry which associates a PDSCH transmission group size with at least one K1 value.

In one aspect, the DCI message may further comprise an indication of a PDSCH transmission group size associated with the plurality of PDSCH transmissions. The indication of the PDSCH transmission group size may correspond to one entry of the at least one entry of the first table. In one aspect, the UE may receive, from the base station via RRC signaling, an indication of a PDSCH transmission group size associated with the plurality of PDSCH transmissions.

Figure 11:
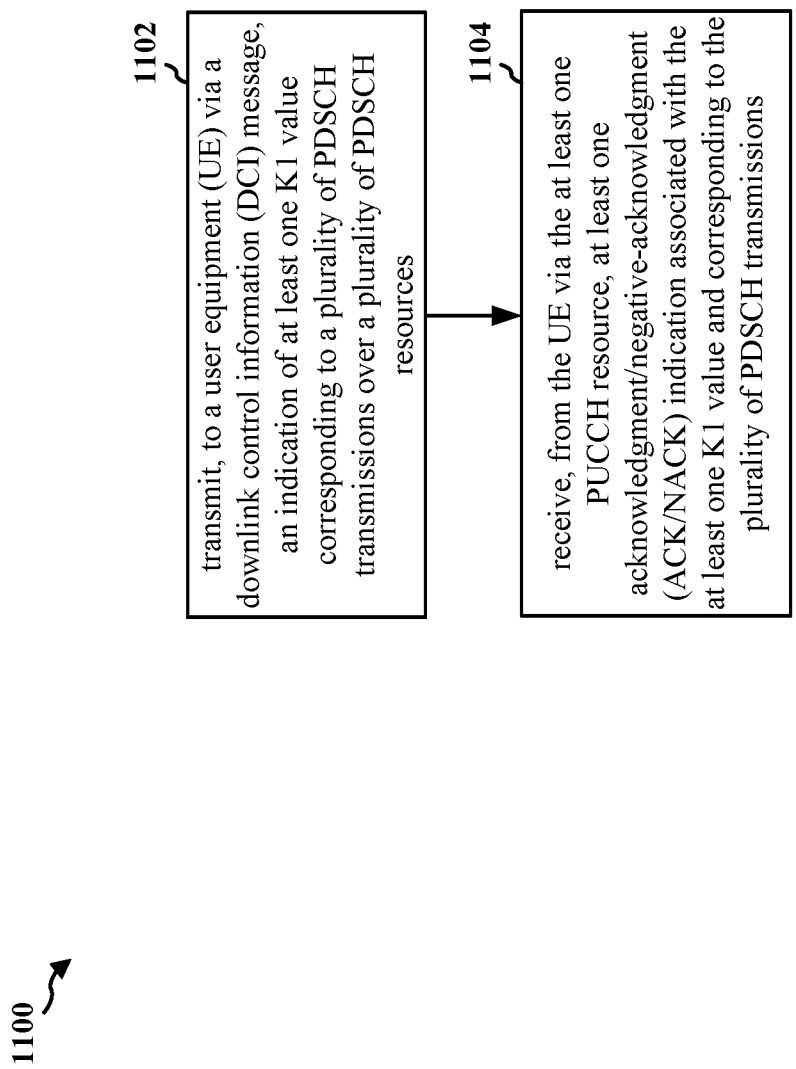
FIG. 11 is a flowchart of a method of wireless communication.

FIG. 11 is a flowchart 1100 of a method of wireless communication. The method may be performed by a base station (e.g., the base station 102/180; the base station 404; the apparatus 1302). At 1102, the base station may transmit, to a UE via a DCI message, an indication of at least one K1 value corresponding to a plurality of PDSCH transmissions over a plurality of PDSCH resources. The DCI message may comprise scheduling information for the plurality of PDSCH transmissions. The at least one K1 value may be associated with at least one PUCCH resource and indicative of a PDSCH-to-HARQ timing. For example, 1102 may be performed by downlink control component 1340 in FIG. 13 via the transmission component 1334.

At 1104, the base station may receive, from the UE via the at least one PUCCH resource, at least one ACK/NACK indication associated with the at least one K1 value and corresponding to the plurality of PDSCH transmissions. For example, 1104 may be performed by the acknowledgment component 1342 in FIG. 13 via the reception component 1330.

In one aspect, the at least one K1 value may indicate a timing delay, in slots, between a corresponding PDSCH resource or a last PDSCH resource of a corresponding group of PDSCH resources and an associated one of the at least one PUCCH resource.

In one aspect, referring back to FIG. 6, the at least one K1 value may comprise a single K1 value applicable to each of the plurality PDSCH transmissions. The at least one PUCCH resource may comprise a plurality of PUCCH resources. Each of the plurality of PDSCH transmissions may correspond to one of the plurality of PUCCH resources. The at least one ACK/NACK indication may comprise a plurality of ACK/NACK indications. The base station may further receive, from the UE via the plurality of PUCCH resources, the plurality of ACK/NACK indications. Each of the plurality of PDSCH transmissions may be associated with one of the plurality of ACK/NACK indications. Each of the plurality of PUCCH resources may carry one of the plurality of ACK/NACK indications.

In one aspect, referring back to FIG. 7, the plurality of PDSCH transmissions may be organized into at least one group of PDSCH transmissions. The at least one K1 value may comprise a single K1 value applicable to each of the at least one group of PDSCH transmissions. Each group of the at least one group of PDSCH transmissions may be associated via the single K1 value with one of the at least one PUCCH resource and one or more of the at least one ACK/NACK indication carried in the one associated PUCCH resource. In one aspect, each of the at least one group of PDSCH transmissions or all except one of the at least one group of PDSCH transmissions may comprise an equal quantity of consecutive PDSCH transmissions.

In one aspect, the plurality of PDSCH transmissions may be organized into a plurality of groups of PDSCH transmissions. The at least one K1 value may comprise a plurality of K1 values. Each of the plurality of K1 values may be applicable to a respective one of the plurality of groups of PDSCH transmissions. Each group of the plurality of groups of PDSCH transmissions may be associated via the respective K1 value with one of the at least one PUCCH resource. The at least one ACK/NACK indication may comprise a plurality of ACK/NACK indications. The base station may further receive, from the UE via the at least one PUCCH resource, the plurality of ACK/NACK indications. Each group of the plurality of groups of PDSCH transmissions may be associated with one or more of the plurality of ACK/NACK indications. In one aspect, each of the plurality of groups of PDSCH transmissions or all except one of the plurality of groups of PDSCH transmissions may comprise an equal quantity of consecutive PDSCH transmissions.

In one aspect, the base station may further transmit, to the UE via RRC signaling, a first limit on a quantity of the at least one PUCCH resource (e.g., the "MaxNumofPucch" limit described above). A group quantity of the plurality of groups of PDSCH transmissions may be less than or equal to the first limit.

In one aspect, the base station may further transmit, to the UE in the DCI message, a second limit on a quantity of the at least one PUCCH resource (e.g., the "NumPucchgroup" parameter described above). The second limit may be less than or equal to the first limit. The group quantity of the plurality of groups of PDSCH transmissions is less than or equal to the second limit.

In one aspect, referring back to FIG. 8, the at least one K1 value may comprise a plurality of K1 values. Each of the plurality of K1 values may be applicable to a respective one of the plurality PDSCH transmissions. Each of the plurality of PDSCH transmissions may be associated via the respective K1 value with one of the at least one PUCCH resource. The at least one ACK/NACK indication may comprise a plurality of ACK/NACK indications. The base station may further receive, from the UE via the at least one PUCCH resource, the plurality of ACK/NACK indications. Each of the plurality of PDSCH transmissions is associated with one of the plurality of ACK/NACK indications.

In one aspect, the indication of the at least one K1 value transmitted via the DCI message may be associated with RRC signaling entry comprising the plurality of K1 values. In one aspect, the indication of the at least one K1 value transmitted via the DCI message may comprise, in the DCI message, the plurality of K1 values.

In one aspect, the plurality of PDSCH transmissions may be organized into at least one group of PDSCH transmissions. Each group of the at least one group of PDSCH transmissions may be associated with one of the at least one K1 value. Each group of the at least one group of PDSCH transmissions may correspond via the associated one K1 value to one of the at least one PUCCH resource and one or more of the at least one ACK/NACK indication. The indication of the at least one K1 value transmitted via the DCI message may be associated with a first table transmitted via RRC signaling (e.g., the table illustrated in FIG. 9). The first table may comprise at least one entry which associates a PDSCH transmission group size with at least one K1 value.

In one aspect, the DCI message may further comprise an indication of a PDSCH transmission group size associated with the plurality of PDSCH transmissions. The indication of the PDSCH transmission group size may correspond to one entry of the at least one entry of the first table. In one aspect, the base station may transmit, to the UE via RRC signaling, an indication of a PDSCH transmission group size associated with the plurality of PDSCH transmissions.

Figure 12:
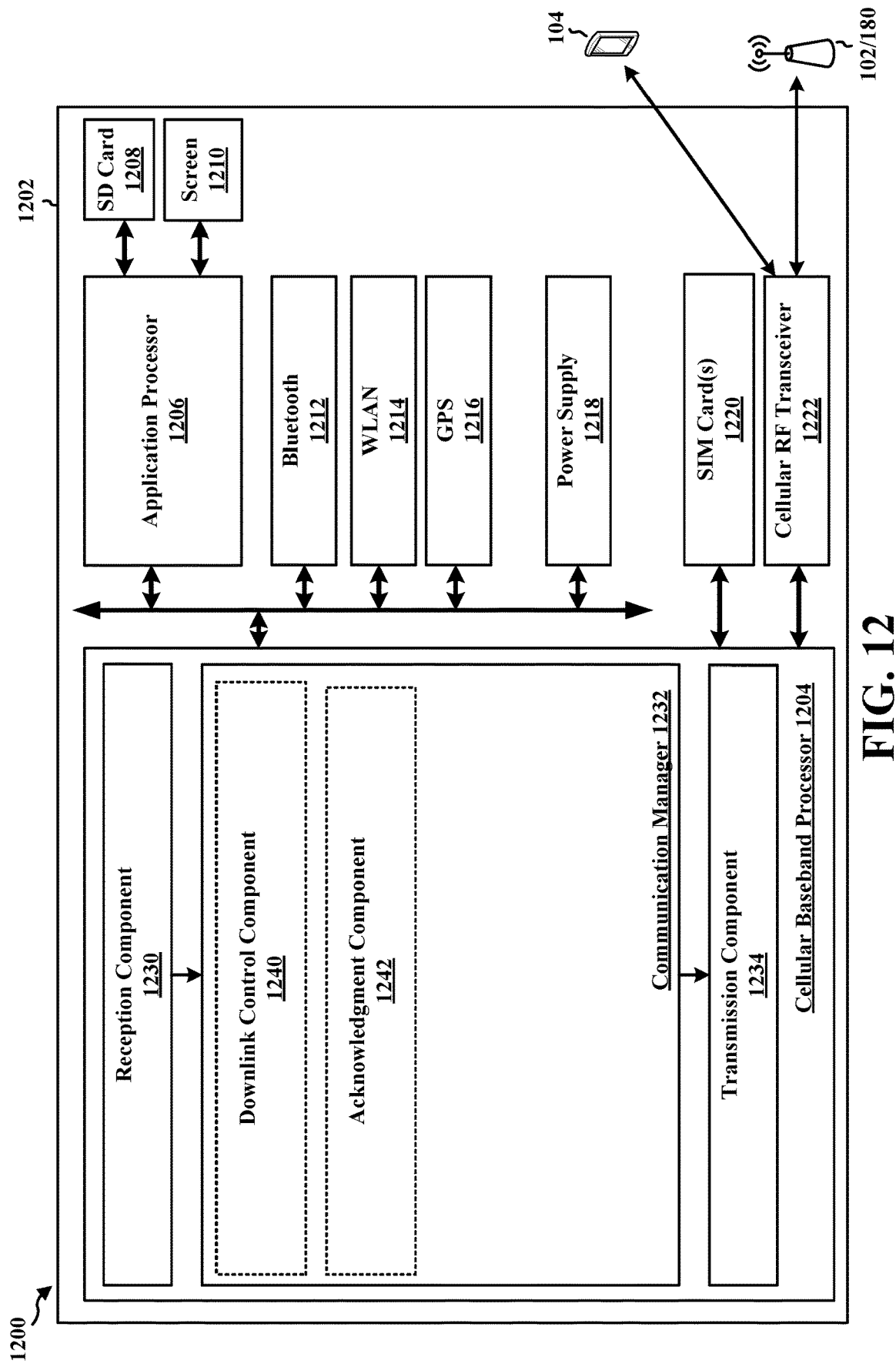
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a downlink control component 1240 that is configured to receive, from a base station via a DCI message, an indication of at least one K1 value corresponding to a plurality of PDSCH transmissions over a plurality of PDSCH resources, the DCI message comprising scheduling information for the plurality of PDSCH transmissions, the at least one K1 value being associated with at least one PUCCH resource and indicative of a PDSCH-to-HARQ timing, e.g., as described in connection with 1002 in FIG. 10. The communication manager 1232 further includes an acknowledgment component 1242 that is configured to transmit, to the base station via the at least one PUCCH resource, at least one ACK/NACK indication associated with the at least one K1 value and corresponding to the plurality of PDSCH transmissions, e.g., as described in connection with 1004 in FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a base station via a DCI message, an indication of at least one K1 value corresponding to a plurality of PDSCH transmissions over a plurality of PDSCH resources, the DCI message comprising scheduling information for the plurality of PDSCH transmissions, the at least one K1 value being associated with at least one PUCCH resource and indicative of a PDSCH-to-HARQ timing; and means for transmitting, to the base station via the at least one PUCCH resource, at least one ACK/NACK indication associated with the at least one K1 value and corresponding to the plurality of PDSCH transmissions. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
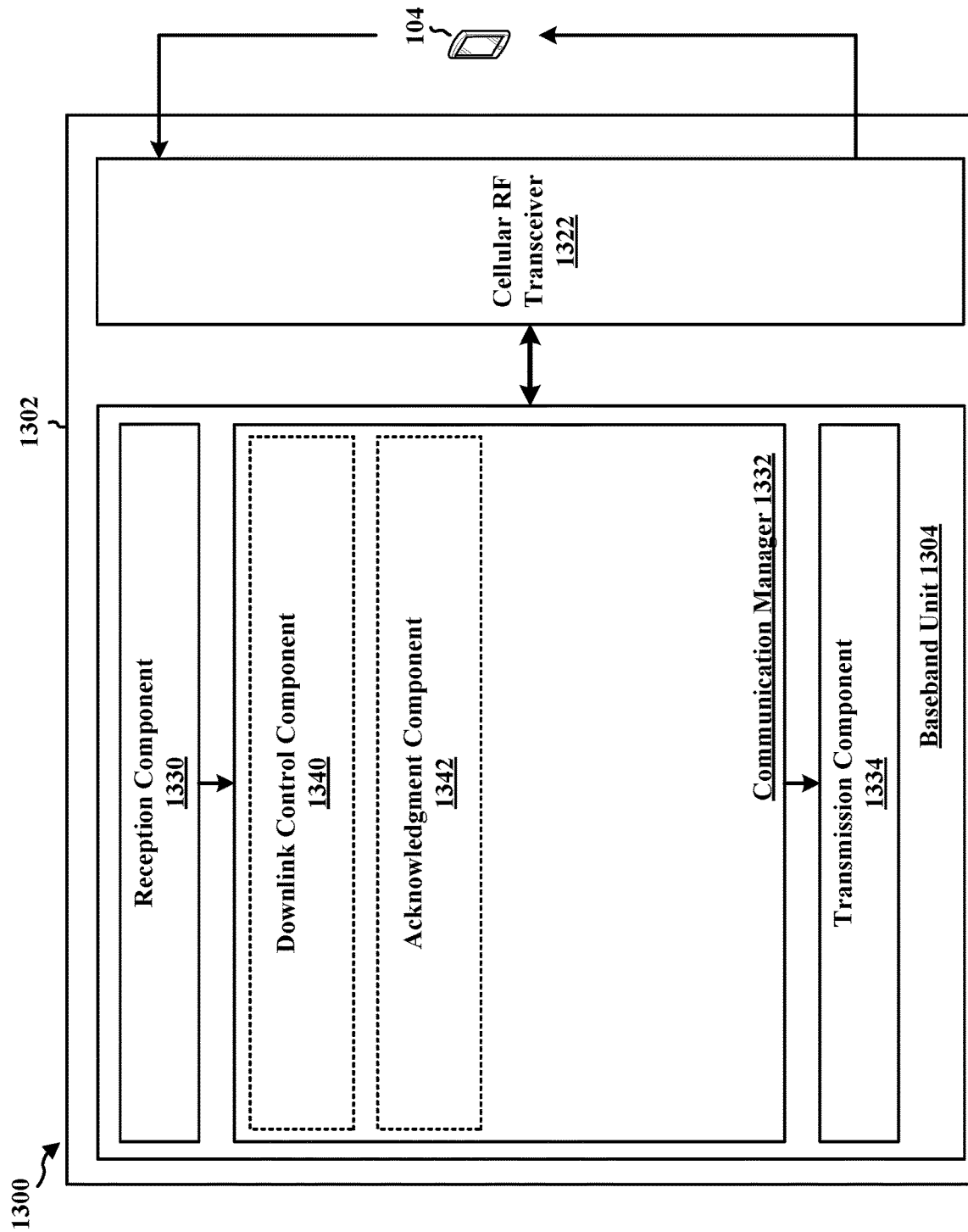
FIG. 13 is a diagram illustrating an example of a hardware implementation for an example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a downlink control component 1340 that is configured to transmit, to a UE via a DCI message, an indication of at least one K1 value corresponding to a plurality of PDSCH transmissions over a plurality of PDSCH resources, the DCI message comprising scheduling information for the plurality of PDSCH transmissions, the at least one K1 value being associated with at least one PUCCH resource and indicative of a PDSCH-to-HARQ timing, e.g., as described in connection with 1102 in FIG. 11. The communication manager 1332 further includes an acknowledgment component 1342 that is configured to receive, from the UE via the at least one PUCCH resource, at least one ACK/NACK indication associated with the at least one K1 value and corresponding to the plurality of PDSCH transmissions, e.g., as described in connection with 1104 in FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to a UE via a DCI message, an indication of at least one K1 value corresponding to a plurality of PDSCH transmissions over a plurality of PDSCH resources, the DCI message comprising scheduling information for the plurality of PDSCH transmissions, the at least one K1 value being associated with at least one PUCCH resource and indicative of a PDSCH-to-HARQ timing; and means for receiving, from the UE via the at least one PUCCH resource, at least one ACK/NACK indication associated with the at least one K1 value and corresponding to the plurality of PDSCH transmissions. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

To provide for indications of timing delay for a plurality of PDSCH transmissions scheduled in a multi-PDSCH grant, an indication of at least one K1 value corresponding to a plurality of PDSCH transmissions over a plurality of PDSCH resources may be transmitted from a base station to a UE via a DCI message. The DCI message may comprise scheduling information for the plurality of PDSCH transmissions. The at least one K1 value may be associated with at least one PUCCH resource and indicative of a PDSCH-to-HARQ timing. The apparatus may transmit, to the base station via the at least one PUCCH resource, at least one ACK/NACK indication associated with the at least one K1 value and corresponding to the plurality of PDSCH transmissions.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE), comprising: receiving, from a base station via a downlink control information (DCI) message, an indication of at least one K1 value corresponding to a plurality of physical downlink shared channel (PDSCH)

transmissions over a plurality of PDSCH resources, the DCI message comprising scheduling information for the plurality of PDSCH transmissions, the at least one K1 value being associated with at least one physical uplink control channel (PUCCH) resource and indicative of a PDSCH-to-hybrid automatic repeat request (HARQ) timing; and transmitting, to the base station via the at least one PUCCH resource, at least one acknowledgment/negative-acknowledgment (ACK/NACK) indication associated with the at least one K1 value and corresponding to the plurality of PDSCH transmissions.

Aspect 2 is the method of aspect 1, where the at least one K1 value indicates a timing delay, in slots, between a corresponding PDSCH resource or a last PDSCH resource of a corresponding group of PDSCH resources and an associated one of the at least one PUCCH resource.

Aspect 3 is the method of any of aspects 1 and 2, where the at least one K1 value comprises a single K1 value applicable to each of the plurality PDSCH transmissions, the at least one PUCCH resource comprising a plurality of PUCCH resources, each of the plurality of PDSCH transmissions corresponding to one of the plurality of PUCCH resources, the at least one ACK/NACK indication comprising a plurality of ACK/NACK indications, and the method further comprising: transmitting, to the base station via the plurality of PUCCH resources, the plurality of ACK/NACK indications, where each of the plurality of PDSCH transmissions is associated with one of the plurality of ACK/NACK indications, each of the plurality of PUCCH resources carries one of the plurality of ACK/NACK indications.

Aspect 4 is the method of any of aspects 1 and 2, where the plurality of PDSCH transmissions are organized into at least one group of PDSCH transmissions, the at least one K1 value comprising a single K1 value applicable to each of the at least one group of PDSCH transmissions, and each group of the at least one group of PDSCH transmissions being associated via the single K1 value with one of the at least one PUCCH resource and one or more of the at least one ACK/NACK indication carried in the one associated PUCCH resource.

Aspect 5 is the method of aspect 4, where each of the at least one group of PDSCH transmissions or all except one of the at least one group of PDSCH transmissions comprises an equal quantity of consecutive PDSCH transmissions.

Aspect 6 is the method of any of aspects 1 and 2, where the plurality of PDSCH transmissions are organized into a plurality of groups of PDSCH transmissions, the at least one K1 value comprising a plurality of K1 values, each of the plurality of K1 values being applicable to a respective one of the plurality of groups of PDSCH transmissions, each group of the plurality of groups of PDSCH transmissions being associated via the respective K1 value with one of the at least one PUCCH resource, the at least one ACK/NACK indication comprising a plurality of ACK/NACK indications, and the method further comprising: transmitting, to the base station via the at least one PUCCH resource, the plurality of ACK/NACK indications, where each group of the plurality of groups of PDSCH transmissions is associated with one or more of the plurality of ACK/NACK indications.

Aspect 7 is the method of aspect 6, where each of the plurality of groups of PDSCH transmissions or all except one of the plurality of groups of PDSCH transmissions comprises an equal quantity of consecutive PDSCH transmissions.

Aspect 8 is the method of aspect 6, further comprising: receiving, from the base station via radio resource control (RRC) signaling, a first limit on a quantity of the at least one PUCCH resource; and organizing the plurality of PDSCH transmissions into the plurality of groups of PDSCH transmissions based on the first limit, where a group quantity of the plurality of groups of PDSCH transmissions is less than or equal to the first limit.

Aspect 9 is the method of aspect 8, further comprising: receiving, from the base station in the DCI message, a second limit on a quantity of the at least one PUCCH resource, the second limit being less than or equal to the first limit; and organizing the plurality of PDSCH transmissions into the plurality of groups of PDSCH transmissions based on the second limit, where the group quantity of the plurality of groups of PDSCH transmissions is less than or equal to the second limit.

Aspect 10 is the method of any of aspects 1 and 2, where the at least one K1 value comprises a plurality of K1 values, each of the plurality of K1 values being applicable to a respective one of the plurality PDSCH transmissions, each of the plurality of PDSCH transmissions being associated via the respective K1 value with one of the at least one PUCCH resource, the at least one ACK/NACK indication comprising a plurality of ACK/NACK indications, and the method further comprising: transmitting, to the base station via the at least one PUCCH resource, the plurality of ACK/NACK indications, where each of the plurality of PDSCH transmissions is associated with one of the plurality of ACK/NACK indications.

Aspect 11 is the method of aspect 10, where the indication of the at least one K1 value received via the DCI message is associated with a radio resource control (RRC) signaling entry comprising the plurality of K1 values.

Aspect 12 is the method of aspect 10, where the indication of the at least one K1 value received via the DCI message comprises, in the DCI message, the plurality of K1 values.

Aspect 13 is the method of any of aspects 1 to 12, where the plurality of PDSCH transmissions are organized into at least one group of PDSCH transmissions, each group of the at least one group of PDSCH transmissions being associated with one of the at least one K1 value, and each group of the at least one group of PDSCH transmissions corresponding via the associated one K1 value to one of the at least one PUCCH resource and one or more of the at least one ACK/NACK indication, where the indication of the at least one K1 value received via the DCI message is associated with a first table received via radio resource control (RRC) signaling, the first table comprising at least one entry which associates a PDSCH transmission group size with at least one K1 value.

Aspect 14 is the method of aspect 13, where the DCI message further comprises an indication of a PDSCH transmission group size associated with the plurality of PDSCH transmissions, the indication of the PDSCH transmission group size corresponding to one entry of the at least one entry of the first table.

Aspect 15 is the method of aspect 13, further comprising: receiving, from the base station via RRC signaling, an indication of a PDSCH transmission group size associated with the plurality of PDSCH transmissions.

Aspect 16 is an apparatus for wireless communication including at least one processor coupled to a memory and configured to implement a method as in any of aspects 1 to 15.

Aspect 17 is an apparatus for wireless communication including means for implementing a method as in any of aspects 1 to 15.

Aspect 18 is a computer-readable medium storing computer executable code, where the code when executed by a processor causes the processor to implement a method as in any of aspects 1 to 15.

Aspect 19 is a method of wireless communication at a base station, comprising: transmitting, to a user equipment (UE) via a downlink control information (DCI) message, an indication of at least one K1 value corresponding to a plurality of physical downlink shared channel (PDSCH) transmissions over a plurality of PDSCH resources, the at least one K1 value being associated with at least one physical uplink control channel (PUCCH) resource and indicative of a PDSCH-to-hybrid automatic repeat request (HARQ) timing; and receiving, from the UE via the at least one PUCCH resource, at least one acknowledgment/negative-acknowledgment (ACK/NACK) indication associated with the at least one K1 value and corresponding to the plurality of PDSCH transmissions.

Aspect 20 is the method of aspect 19, where the at least one K1 value indicates a timing delay, in slots, between a corresponding PDSCH resource or a last PDSCH resource of a corresponding group of PDSCH resources and an associated one of the at least one PUCCH resource.

Aspect 21 is the method of any of aspects 19 and 20, where the at least one K1 value comprises a single K1 value applicable to each of the plurality PDSCH transmissions, the at least one PUCCH resource comprising a plurality of PUCCH resources, each of the plurality of PDSCH transmissions corresponding to one of the plurality of PUCCH resources, the at least one ACK/NACK indication comprising a plurality of ACK/NACK indications, and the method further comprising: receiving, from the UE via the plurality of PUCCH resources, the plurality of ACK/NACK indications, where each of the plurality of PDSCH transmissions is associated with one of the plurality of ACK/NACK indications, each of the plurality of PUCCH resources carries one of the plurality of ACK/NACK indications.

Aspect 22 is the method of any of aspects 19 and 20, where the plurality of PDSCH transmissions are organized into at least one group of PDSCH transmissions, the at least one K1 value comprising a single K1 value applicable to each of the at least one group of PDSCH transmissions, and each group of the at least one group of PDSCH transmissions being associated via the single K1 value with one of the at least one PUCCH resource and one or more of the at least one ACK/NACK indication carried in the one associated PUCCH resource.

Aspect 23 is the method of aspect 22, where each of the at least one group of PDSCH transmissions or all except one of the at least one group of PDSCH transmissions comprises an equal quantity of consecutive PDSCH transmissions.

Aspect 24 is the method of any of aspects 19 and 20, where the plurality of PDSCH transmissions are organized into a plurality of groups of PDSCH transmissions, the at least one K1 value comprising a plurality of K1 values, each of the plurality of K1 values being applicable to a respective one of the plurality of groups of PDSCH transmissions, each group of the plurality of groups of PDSCH transmissions being associated via the respective K1 value with one of the at least one PUCCH resource, the at least one ACK/NACK indication comprising a plurality of ACK/NACK indications, and the method further comprising: receiving, from the UE via the at least one PUCCH resource, the plurality of ACK/NACK indications, where each group of the plurality of groups of PDSCH transmissions is associated with one or more of the plurality of ACK/NACK indications.

Aspect 25 is the method of aspect 24, where each of the plurality of groups of PDSCH transmissions or all except one of the plurality of groups of PDSCH transmissions comprises an equal quantity of consecutive PDSCH transmissions.

Aspect 26 is the method of aspect 24, further comprising: transmitting, to the UE via radio resource control (RRC) signaling, a first limit on a quantity of the at least one PUCCH resource, where a group quantity of the plurality of groups of PDSCH transmissions is less than or equal to the first limit.

Aspect 27 is the method of aspect 26, further comprising: transmitting, to the UE in the DCI message, a second limit on a quantity of the at least one PUCCH resource, the second limit being less than or equal to the first limit, where the group quantity of the plurality of groups of PDSCH transmissions is less than or equal to the second limit.

Aspect 28 is the method of any of aspects 19 and 20, where the at least one K1 value comprises a plurality of K1 values, each of the plurality of K1 values being applicable to a respective one of the plurality PDSCH transmissions, each of the plurality of PDSCH transmissions being associated via the respective K1 value with one of the at least one PUCCH resource, the at least one ACK/NACK indication comprising a plurality of ACK/NACK indications, and the method further comprising: receiving, from the UE via the at least one PUCCH resource, the plurality of ACK/NACK indications, where each of the plurality of PDSCH transmissions is associated with one of the plurality of ACK/NACK indications.

Aspect 29 is the method of aspect 28, where the indication of the at least one K1 value transmitted via the DCI message is associated with a radio resource control (RRC) signaling entry comprising the plurality of K1 values.

Aspect 30 is the method of aspect 28, where the indication of the at least one K1 value transmitted via the DCI message comprises, in the DCI message, the plurality of K1 values.

Aspect 31 is the method of any of aspects 19 to 30, where the plurality of PDSCH transmissions are organized into at least one group of PDSCH transmissions, each group of the at least one group of PDSCH transmissions being associated with one of the at least one K1 value, and each group of the at least one group of PDSCH transmissions corresponding via the associated one K1 value to one of the at least one PUCCH resource and one or more of the at least one ACK/NACK indication, where the indication of the at least one K1 value transmitted via the DCI message is associated with a first table transmitted via radio resource control (RRC) signaling, the first table comprising at least one entry which associates a PDSCH transmission group size with at least one K1 value.

Aspect 32 is the method of aspect 31, where the DCI message further comprises an indication of a PDSCH transmission group size associated with the plurality of PDSCH transmissions, the indication of the PDSCH transmission group size corresponding to one entry of the at least one entry of the first table.

Aspect 33 is the method of aspect 31, further comprising: transmitting, to the UE via RRC signaling, an indication of a PDSCH transmission group size associated with the plurality of PDSCH transmissions.

Aspect 34 is an apparatus for wireless communication including at least one processor coupled to a memory and configured to implement a method as in any of aspects 19 to 33.

Aspect 35 is an apparatus for wireless communication including means for implementing a method as in any of aspects 19 to 33.

Aspect 36 is a computer-readable medium storing computer executable code, where the code when executed by a processor causes the processor to implement a method as in any of aspects 19 to 33.

What is claimed is:

1. An apparatus for wireless communication, comprising:
   a memory; and
   at least one processor coupled to the memory, wherein the apparatus is configured to:
   receive a single downlink control information (DCI) message including scheduling information for reception of a plurality of physical downlink shared channel (PDSCH) transmissions over a plurality of PDSCH resources, wherein the single DCI message comprises information indicative of at least one K1 value for the plurality of PDSCH transmissions scheduled by the single DCI message, and wherein the at least one K1 value is associated with at least one physical uplink control channel (PUCCH) resource and indicative of a PDSCH-to-hybrid automatic repeat request (HARQ) timing:
   receive, via radio resource control (RRC) signaling, first information indicative of a first limit on a quantity of the at least one PUCCH resource;
   organize the plurality of PDSH transmissions into a plurality of groups of PDSCH transmissions based on the first limit, wherein a group quantity of the plurality of groups of PDSCH transmissions is less than or equal to the first limit; and
   transmit, via the at least one PUCCH resource, at least one acknowledgement/negative-acknowledgement (ACK/NACK) indication associated with the at least one K1 value and corresponding to the plurality of PDSCH transmissions.

2. The method of claim 1, wherein the information indicative of the at least one K1 value indicates a timing delay, in slots, between a corresponding PDSCH resource or a last PDSCH resource of a corresponding group of PDSCH resources and an associated PUCCH resource.

3. The method of claim 2, wherein the at least one K1 value comprises a single K1 value applicable to each of the plurality of PDSCH transmissions, wherein the at least one PUCCH resource comprises a plurality of PUCCH resources, wherein each of the plurality of PDSCH transmissions correspond to one of the plurality of PUCCH resources, wherein the at least one ACK/NACK indication comprises a plurality of ACK/NACK indications, wherein each of the plurality of PDSCH transmissions is associated with one of the plurality of ACK/NACK indications, and wherein each of the plurality of PUCCH resources carries one of the plurality of ACK/NACK indications.

4. The method of claim 2, wherein the at least one K1 value comprises a single K1 value applicable to each group of the plurality of groups of PDSCH transmissions.

5. The method of claim 4, wherein each of the plurality of groups of PDSCH transmissions comprises an equal quantity of consecutive PDSCH transmissions.

6. The apparatus of claim 4, wherein all groups except one group of the plurality of groups of PDSCH transmissions comprise an equal quantity of consecutive PDSCH transmissions.

7. The apparatus of claim 4, wherein each group of the plurality of groups of PDSCH transmissions is associated via the single K1 value with one of the at least one PUCCH resource and one or more of the at least one ACK/NACK indication carried in the one associated PUCCH resource.

8. The method of claim 2, wherein the at least one K1 value comprises a plurality of K1 values, wherein each of the plurality of K1 values is applicable to a respective one group of the plurality of groups of PDSCH transmissions, wherein the at least one PUCCH resource, the at least one ACK/NACK indication comprising a plurality of ACK/NACK indication comprises a plurality of ACK/NACK indications, and wherein each group of the plurality of groups of PDSCH transmissions is associated with one or more of the plurality of ACK/NACK indications.

9. The method of claim 8, wherein each of the plurality of groups of PDSCH transmissions comprises an equal quantity of consecutive PDSCH transmissions.

10. The method of claim 8, wherein the single DCI message comprises second information indicative of a second limit on the quantity of the at least one PUCCH resource, wherein the second limit is less than or equal to the first limit, and wherein, to organize the plurality of PDSCH transmissions into the plurality of groups of PDSCH transmissions, the apparatus is configured to:
    organizing the plurality of PDSCH transmissions into the plurality of groups of PDSCH transmissions based on the second limit, wherein the group quantity of the plurality of groups of PDSCH transmissions is less than or equal to the second limit.

11. The apparatus of claim 8, wherein each group of the plurality of groups of PDSCH transmissions is associated via the respective K1 value with one of the at least one PUCCH resource, the at least one ACK/NACK indication comprising a plurality of ACK/NACK indications.

12. The apparatus of claim 8, wherein all groups except one group of the plurality of groups of PDSCH transmissions comprise an equal quantity of consecutive PDSCH transmissions.

13. The method of claim 2, wherein the at least one K1 value comprises a plurality of K1 values, wherein each of the plurality of K1 values is applicable to a respective one group of the plurality PDSCH transmissions, wherein each of the plurality of PDSCH transmissions is associated via the respective K1 value with one of the at least one PUCCH resource, wherein the at least one ACK/NACK indication comprises a plurality of ACK/NACK indications, and wherein each of the plurality of PDSCH transmissions is associated with one of the plurality of ACK/NACK indications.

14. The method of claim 13, wherein the indication of the at least one K1 value is associated with a radio resource control (RRC) signaling entry comprising the plurality of K1 values.

15. The method of claim 13, wherein the indication of the at least one K1 value comprises the plurality of K1 values.

16. The method of claim 2, wherein each group of the plurality of groups of PDSCH transmissions is associated with one of the at least one K1 value, wherein each group of the plurality of groups of PDSCH transmissions correspond via the associated one K1 value to one of the at least one PUCCH resource and one or more of the at least one ACK/NACK indication, wherein the information indication of the at least one K1 value is associated with a first table received via radio resource control (RRC) signaling, and wherein the first table comprises at least one entry which associates a PDSCH transmission group size with at least one K1 value.

17. The method of claim 16, wherein the DCI message further comprises additional information indicative of a PDSCH transmission group size, and wherein the information indicative of the PDSCH transmission group size corresponds to one entry of the at least one entry of the first table.

18. The method of claim 16, wherein the apparatus is configured to:
receive, via RRC signaling, additional information indicative of a PDSCH transmission group size.

19. An apparatus for wireless communication performed by an apparatus, the method comprising:
receiving a single downlink control information (DCI) message including scheduling information for reception of a plurality of physical downlink shared channel (PDSCH) transmissions over a plurality of PDSCH resources, wherein the single DCI message comprises information indicative of at least one K1 value for the plurality of PDSCH transmissions scheduled by the single DCI message, and wherein the at least one K1 value is associated with at least one physical uplink control channel (PUCCH) rersource and indicative of a PDSCH-to-hybrid automatic repeat request (HArQ) timing;
receiving, via radio resource control (RRC) signaling, first information indicative of a first limit on a quantity of the at least one PUCCH resource;
organizing the plurality of PDSCH transmissions into a plurality of groups of PDSCH transmissions based on the first limit, wherein a group quantity of the plurality of groups of PDSCH transmissions is less than or equal to the first limit; and
transmitting, via the at least one PUCCH resource, at least one acknowledgement/negative-acknowledgement (ACK/NACK) indication associated with the at least one K1 value and corresponding to the plurality of PDSCH transmissions.

20. An apparatus for wireless communication comprising:
a memory; and
at least one processor coupled to the memory, wherein the apparatus is configured to:
transmit, for a user equipment (UE) via a single downlink control information (DCI) message including scheduling information for reception of a plurality of physical downlink shared channel (PDSCH) transmissions over a plurality of PDSCH resources, wherein the single DCI message comprises information indicative of at least one K1 value for the plurality of PDSCH transmissions scheduled by the single DCI message, and wherein the at least one K1 value is associated with at least one physical uplink control channel (PUCCH) resource and indicative of a PDSCH-to-hybrid automatic repeat request (HARQ) timing;
transmit, for the UE via radio resource control (RRC) signaling, first information indicative of a first limit on a quantity of the at least one PUCCH resource, wherein a group quantity of the plurality of groups of PDSCH transmissions is less than or equal to the first limit; and
receive, form the UE via the at least one PUCCH resource, at least one acknowledgement/negative-acknowledgement (ACK/NACK) indication associated with the at least one K1 value and corresponding to the plurality of PDSCH transmissions.

21. The method of claim 20, wherein the information indicative of the at least one K1 value indicates a timing delay, in slots, between a corresponding PDSCH resource or a last PDSCH resource of a corresponding group of PDSCH resources and an associated PUCCH resource.

22. The method of claim 21, wherein the at least one K1 value comprises a single K1 value applicable to each of the plurality PDSCH transmissions, wherein the at least one PUCCH resource comprises a plurality of PUCCH resources, wherein each of the plurality of PDSCH transmissions correspond to one of the plurality of PUCCH resources, wherein the at least one ACK/NACK indication comprises a plurality of ACK/NACK indications, wherein each of the plurality of PDSCH transmissions is associated with one of the plurality of ACK/NACK indications, and wherein each of the plurality of PUCCH resources carries one of the plurality of ACK/NACK indications.

23. The method of claim 21, wherein the at least one K1 value comprises a single K1 value applicable to each group of the plurality of groups of PDSCH transmissions.

24. The method of claim 23, wherein each of the plurality of groups of PDSCH transmissions comprises an equal quantity of consecutive PDSCH transmissions.

25. The apparatus of claim 23, wherein all groups except one group of the plurality of groups of PDSCH transmissions comprise an equal quantity of consecutive PDSCH transmissions.

26. The apparatus of claim 23, wherein each group of the plurality of groups of PDSCH transmissions is associated via the single K1 value with one of the at least one PUCCH resource and one or more of the at least one ACK/NACK indication carried in the one associated PUCCH resource.

27. The method of claim 21, wherein the at least one K1 value comprising a plurality of K1 value comprises a plurality of K1 values, wherein each of the plurality of K1 values is applicable to a respective one group of the plurality of groups of PDSCH transmissions, wherein the at least one ACK/NACK indication comprises a plurality of ACK/NACK indications, and wherein each group of the plurality of groups of PDSCH transmissions is associated with one or more of the plurality of ACK/NACK indications.

28. The method of claim 27, wherein each of the plurality of groups of PDSCH transmissions comprises an equal quantity of consecutive PDSCH transmissions.

29. The method of claim 27, wherein the single DCI message comprises second information indicative of a second limit on the quantity of the at least one PUCCH resource, wherein the second limit is less than or equal to the first limit, and wherein the group quantity of the plurality of groups of PDSCH transmissions is less than or equal to the second limit.

30. The apparatus of claim 27, wherein each group of the plurality of groups of PDSCH transmissions is associated via the respective K1 value with one of the at least one PUCCH resource, the at least one ACK/NACK indication comprising a plurality of ACK/NACK indications.

31. The apparatus of claim 27, wherein all groups except one group of the plurality of groups of PDSCH transmissions comprise an equal quantity of consecutive PDSCH transmissions.

32. The method of claim 21, wherein the at least one K1 value comprises a plurality of K1 values, wherein each of the plurality of K1 values is applicable to a respective one group of the plurality PDSCH transmissions, wherein each of the plurality of PDSCH transmissions is associated via the respective K1 value with one of the at least one PUCCH resource, wherein the at least one ACK/NACK indication comprises a plurality of ACK/NACK indications, and wherein each of the plurality of PDSCH transmissions is associated with one of the plurality of ACK/NACK indications.

33. The method of claim 32, wherein the indication of the at least one K1 value is associated with a radio resource control (RRC) signaling entry comprising the plurality of K1 values.

34. The method of claim 32, wherein the information indicative of the at least one K1 value comprises, in the single DCI message, the plurality of K1 values.

35. The method of claim 21, wherein each group of the plurality of groups of PDSCH transmissions is associated with one of the at least one K1 value, wherein each group of the plurality of groups of PDSCH transmissions correspond via the associated one K1 value to one of the at least one PUCCH resource and one or more of the at least one ACK/NACK indication, wherein the information indication of the at least one K1 value is associated with a first table transmitted via radio resource control (RRC) signaling, and wherein the first table comprises at least one entry which associates a PDSCH transmission group size with at least one K1 value.

36. An apparatus for wireless communication performed by an apparatus, the method comprising:

transmitting, for a user equipment (UE) via a downlink control information (DCI) message, including scheduling information for reception of a plurality of physical downlink shared channel (PDSCH) transmissions over a plurality of PDSCH resources, wherein the single DCI message comprises information indicative of at least one K1 value for the plurality of PDSCH transmissions scheduled by the single DCI message, and wherein the at least one K1 value is associated with at least one physical uplink control channel (PUCCH) resource and indicative of a PDSCH-to-hybrid automatic repeat request (HARQ) timing;

transmitting, for the UE via radio resource control (RRC) signaling, first information indicative of a first limit on a quantity of the at least one PUCCH resource, wherein a group quantity of the plurality of groups of PDSCH transmissions is less than or equal to the first limit; and receiving, from the UE via the at least one PUCCH resource, at least one acknowledgment/negative-acknowledgment (ACK/NACK) indication associated with the at least one K1 value and corresponding to the plurality of PDSCH transmissions.

* * * * *